US012390378B2

(12) United States Patent
St. John et al.

(10) Patent No.: US 12,390,378 B2
(45) Date of Patent: Aug. 19, 2025

(54) PATIENT SUPPORT WITH LIFT ASSEMBLY

(71) Applicant: Stryker Corporation, Kalamazoo, MI (US)

(72) Inventors: Connor Feldpausch St. John, Kalamazoo, MI (US); William Dwight Childs, Plainwell, MI (US); Gary L. Bartley, Kalamazoo, MI (US)

(73) Assignee: Stryker Corporation

( * ) Notice: Subject to any disclaimer, the term of this patent is extended or adjusted under 35 U.S.C. 154(b) by 31 days.

(21) Appl. No.: 17/116,240

(22) Filed: Dec. 9, 2020

(65) Prior Publication Data

US 2021/0177679 A1 Jun. 17, 2021

Related U.S. Application Data

(60) Provisional application No. 62/948,540, filed on Dec. 16, 2019.

(51) Int. Cl.

*A61G 7/012* (2006.01)
*A61G 1/013* (2006.01)
*A61G 7/002* (2006.01)
*A61G 7/005* (2006.01)
*A61G 7/018* (2006.01)

(52) U.S. Cl.

CPC ............. *A61G 7/012* (2013.01); *A61G 1/013* (2013.01); *A61G 7/018* (2013.01); *A61G 7/002* (2013.01); *A61G 7/005* (2013.01)

(58) Field of Classification Search

CPC ........ A61G 7/002; A61G 7/012; A61G 7/015; A61G 7/018; A61G 1/0562; A61G 1/0567; A47C 20/04; A47C 20/041

See application file for complete search history.

(56) References Cited

U.S. PATENT DOCUMENTS 3,203,670 A 8/1965 Farris
3,282,566 A 11/1966 Clarke
5,317,769 A 6/1994 Weismiller et al.
(Continued)

FOREIGN PATENT DOCUMENTS

EP 2777672 B1 * 11/2016 ............ A61G 7/012
JP 2016-183876 A 10/2016
WO WO-2011021002 A2 * 2/2011 ............ A47C 1/031

OTHER PUBLICATIONS

PCT Written Opinion of the International Searching Authority regarding PCT/US2020/64212, dated May 26, 2021.
(Continued)

*Primary Examiner* — Justin C Mikowski
*Assistant Examiner* — Deborah Talitha Gedeon
(74) *Attorney, Agent, or Firm* — Warner Norcross + Judd LLP

(57) ABSTRACT

A patient support apparatus includes a frame supported relative to a floor, the frame configured to support a deck for supporting a patient thereon, and a lift assembly for raising or lowering the frame relative to the floor. The lift assembly includes lifting legs coupled to the frame and an actuator with a body and an extendible member. The actuator is mounted to one of the legs, rather than the frame, and mounted for linear movement with respect to the one leg, with the linear movement translated into rotational movement of the other leg by a link and crank arm arrangement.

19 Claims, 38 Drawing Sheets

(56) References Cited

U.S. PATENT DOCUMENTS

| | | | | |
|---|---|---|---|---|
| 6,071,228 | A | 6/2000 | Speraw et al. | |
| 7,296,312 | B2 | 11/2007 | Menkedick et al. | |
| 7,690,059 | B2 | 4/2010 | Lemire et al. | |
| 2005/0120481 | A1 | 6/2005 | Farmont et al. | |
| 2006/0021144 | A1* | 2/2006 | Hornbach | A61G 7/018 5/618 |
| 2006/0059624 | A1 | 3/2006 | Poulos et al. | |
| 2009/0094747 | A1* | 4/2009 | Bly | A61G 7/018 74/522 |
| 2014/0033435 | A1 | 2/2014 | Jutras | |
| 2014/0325759 | A1 | 11/2014 | Bly et al. | |
| 2016/0302985 | A1* | 10/2016 | Tessmer | A61G 7/012 |
| 2017/0172309 | A1 | 6/2017 | Ahn et al. | |
| 2017/0172829 | A1 | 6/2017 | Tessmer et al. | |
| 2017/0258655 | A1* | 9/2017 | Jutras | A61B 5/1115 |
| 2019/0133858 | A1 | 5/2019 | Tessmer et al. | |
| 2019/0247257 | A1 | 8/2019 | Furman et al. | |
| 2019/0322502 | A1 | 10/2019 | Lykkegaard | |
| 2024/0082079 | A1 | 3/2024 | Souke et al. | |

OTHER PUBLICATIONS

PCT International Search Report regarding PCT/US2020/64212, dated May 26, 2021.

* cited by examiner

PATIENT SUPPORT WITH LIFT ASSEMBLY

This application claims the benefit of U.S. Prov. App. Ser. No. 62/948,540, entitled PATIENT SUPPORT WITH LIFT ASSEMBLY, filed on Dec. 16, 2019 (P-600), which is incorporated by reference in its entirety herein.

BACKGROUND

The present disclosure relates to a patient support apparatus with a lift assembly for raising or lowering a patient support apparatus deck relative to a floor surface. More specifically, the present disclosure relates to a patient support apparatus with a lift assembly that can lower the patient support apparatus deck to a very low height while still providing a full range of motion to a height where a caregiver can access the patient.

SUMMARY

A lift mechanism is described that is compact at a very low height while still providing a long range of travel to raise the patient support apparatus deck to a height that is suitable for caregivers. Further, the lift mechanism is configured so that it can raise or lower one end of the patient support deck to orient the patient in a Trendelenburg or reverse Trendelenburg position.

In one form, a patient support apparatus includes a base, a frame supported relative the base, with the frame configured to support a deck for supporting a patient thereon. The patient support apparatus further includes a lift assembly for raising or lowering the frame relative to the base. The lift assembly includes a first leg and a second leg, with the first leg being pivotally coupled to the frame at an upper end thereof and pivotally and slidably coupled to the base at a lower end thereof. The second leg is pivotally at its upper end mounted to the first leg at a medial portion thereof to form an inverted Y-shaped leg assembly when unfolded. The lift assembly further includes an actuator mounted in the leg assembly with a mounting configuration to produce a maximum force F1 when raising the frame occurring after the lift assembly is raised from its lowermost configuration. For example, the maximum force F1 may occur approximately at mid-stroke of the lift assembly.

In one embodiment, the actuator is mounted in the leg assembly with a mounting configuration to produce a starting force SF wherein the starting force SF is in a range of 95% to 99% of or 96% to 98% of or about 97% of the maximum force F1.

In one aspect, the actuator is mounted with a mounting configuration to produce a minimum force F2 when raising or lowering the frame wherein the minimum force F2 is in a range of 50% to 70% of the maximum force F1 and, optionally, about 60% of the maximum force F1.

In another embodiment, a patient support apparatus includes a base, a frame supported relative to the base, which is configured to support a deck for supporting a patient thereon, and a lift assembly for raising or lowering the frame relative to the base. The lift assembly is pivotally coupled to the frame at an upper end thereof and pivotally coupled to the base at a lower end thereof. The lift assembly includes a first leg and a second leg, with the second leg being pivotally mounted to the first leg at a medial portion thereof to form an inverted Y-shaped leg assembly when unfolded. An actuator is mounted in the leg assembly with a mounting configuration to produce a maximum force F1 and a minimum force F2 when raising or lowering the frame wherein the minimum force F2 is a range of 55% to 65% of the maximum force F1. For example, the minimum force F2 may occur at a maximum height of the lift assembly.

In one aspect, the actuator is mounted in the leg assembly with a mounting configuration to produce a starting force SF wherein the minimum force F2 is in a range of 55% to 65% of the starting force SF.

In another embodiment, a patient support apparatus includes a base, a frame supported relative to the base, which is configured to support a deck for supporting a patient thereon, and a lift assembly for raising or lowering the frame relative to the base. The lift assembly is pivotally coupled to the frame at an upper end thereof and pivotally coupled to the base at a lower end thereof. The lift assembly includes an actuator and a first leg and a second leg, with the second leg being pivotally mounted to the first leg at a medial portion thereof to form an inverted Y-shaped leg assembly when unfolded. The actuator is mounted in the leg assembly to the first leg on one end by a first connection and at its opposed end by a second sliding pivotal connection to the first leg.

In one aspect, the second sliding pivot connection is linked to the second leg wherein when the actuator extends or contracts, the first leg and the second leg are unfolded or folded with respect to each other.

In a further aspect, the first leg includes an upper pivot connection to the frame, a lower pivot connection to the base, and further comprises a drive link coupled on one end to the actuator and coupled at its opposed end to the first leg by a sliding link pivot connection. The drive link is eccentrically coupled to the second leg.

In one aspect, the sliding link pivot connection between the drive link and the first leg comprises a non-linear sliding pivot connection.

In another aspect, the sliding link pivot connection between the drive link and the first leg extends below the lower pivot connection of the first leg when the lift assembly is in its lowermost position.

In yet another embodiment, a patient support apparatus includes a base, a frame supported relative to the base, which is configured to support a deck for supporting a patient thereon, and a lift assembly for raising or lowering the frame relative to the base. The lift assembly is pivotally coupled to the frame at an upper end thereof and pivotally coupled to the base at a lower end thereof. The lift assembly includes an actuator and a first leg and a second leg, with the second leg being pivotally mounted to the first leg at a medial portion thereof to form an inverted Y-shaped leg assembly when unfolded. The second leg has a crank arm. The lift assembly further includes a drive link having first and second ends, with the first end of the drive link pivotally coupled to actuator and the second end of the drive link coupled to the crank arm and configured to move in a nonlinear path to thereby to push or pull on the crank arm from a range of angles and thereby unfold or fold the first leg and the second leg with respect to each other to contract or extend the lift assembly.

In one aspect, the first leg includes an upper pivot connection to the frame, a lower pivot connection to the base, and the driving link is slidingly coupled to the first leg by a sliding pivot connection and eccentrically coupled the crank arm.

In another aspect, the sliding pivot connection comprises a non-linear sliding pivot connection.

According to yet another embodiment, a patient support apparatus includes a base, a frame supported relative to the base, which is configured to support a deck for supporting a patient thereon, a head end actuator, and a foot end actuator. The patient support further includes a lift assembly for raising or lowering the frame relative to the base, which includes a head end leg assembly and a foot end leg assembly. Each of the leg assemblies has a pair of legs, with each pair of legs including a first leg and a second leg forming an inverted Y-shaped configuration when raising the frame and being folded generally flat when lowering the frame. The first legs are pivotally mounted at their upper ends to the frame and pivotally mounted at their lower ends to the base. Each pair of legs has a folding pivot axis, and each of the head end and foot end actuators has a first connection to its respective first leg and a sliding lower pivot connection to its respective first leg, wherein the first and second legs of each leg assembly are linked such that extension and contraction of their respective actuators will unfold or fold the leg assemblies to raise or lower the frame.

In one aspect, each of the first legs is linked to its respective second leg by a drive link, which are eccentrically mounted to their respective second legs.

In a further aspect, one end of each of the drive links is coupled to its respective first leg by a sliding pivot connection with an arcuate path.

In another aspect, the sliding pivot connections of the actuators to the first legs have linear paths.

According to another aspect, the head end leg assembly is independent from the foot end leg assembly.

In yet another embodiment, the lifting leg of the head end leg assembly is pivotally mounted at a head end pivot connection at or near the head end of the frame, and the lifting leg of the foot end leg assembly is pivotally mounted at a foot end pivot connection at or near the foot end of the frame.

In a further aspect, the head end and foot end pivot connections are offset below the frame.

In another embodiment, a patient support apparatus includes a base, a support frame supported relative to the base, which is configured to support a deck for supporting a patient thereon, and a lift assembly. The lift assembly includes a head end leg assembly and a foot end leg assembly. Each of the leg assemblies has an actuator and forms an independent assembly that can be mounted between the base and the support frame as an assembled unit simply inserting the pivot connections between the leg assembly and the base and coupling the pivot connections between the leg assembly and the support frame.

For example, in one aspect, the head end leg assembly and the foot end leg assembly each have an inverted Y-shaped configuration when the lift assembly moves the support frame to a raised position.

In yet further aspects, at least one of the leg assemblies includes first and second lifting legs. Optionally, the first lifting leg comprises an inverted U-shaped frame. Similarly, the second lifting leg may comprise a second inverted U-shaped frame. In another embodiment, one or both lifting legs may be L-shaped.

In another embodiment, the second lifting leg forms a stop for the first lifting leg when the lift assembly is folded to it lowermost configuration.

According to yet another embodiment, a patient support apparatus includes a base, a frame supported relative to the base, with the frame configured to support a cushion for supporting a patient thereon, and a lift assembly for raising or lowering the frame relative to the base. The lift assembly includes a first lifting leg and a second lifting leg. A linear actuator is mounted to the first lifting leg on one end and mounted to the first lifting leg at another end for linear movement relative to the first leg. The second lifting leg is linked to the actuator in a manner to cause the second lifting leg to pivot about the first lifting leg when the linear actuator is extended or contracted.

In yet another aspect, the second lifting leg includes a crank arm that is coupled to the actuator by a link so that extension or retraction of the actuator induces rotation of the second lifting leg.

These and other objects, advantages, and features of the disclosure will be more fully understood and appreciated by reference to the description of the current embodiment and the drawings.

Before the embodiments of the disclosure are explained in detail, it is to be understood that the disclosure is not limited to the details of operation or to the details of construction and the arrangement of the components set forth in the following description or illustrated in the drawings. The disclosure may be implemented in various other embodiments and is capable of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the disclosure to any specific order or number of components. Nor should the use of enumeration be construed as excluding from the scope of the disclosure any additional steps or components that might be combined with or into the enumerated steps or components.

DETAILED DESCRIPTION OF THE EMBODIMENTS

Figure 1:
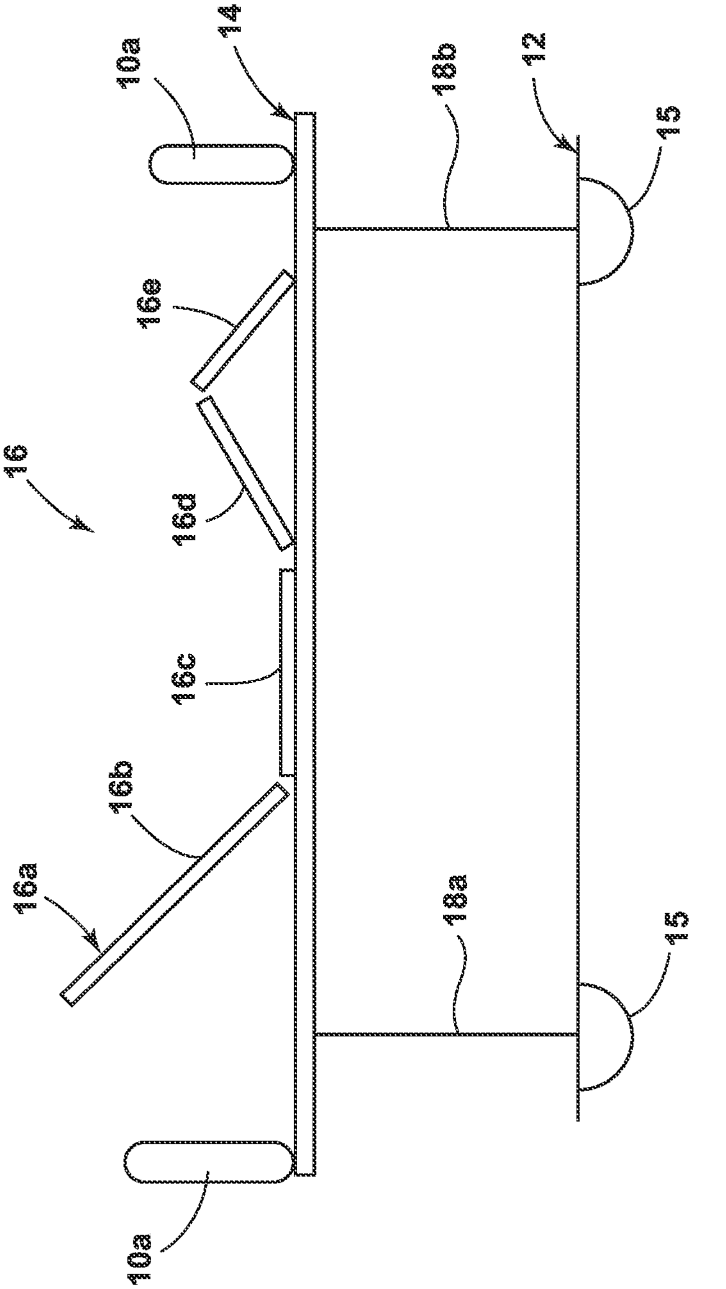
FIG. 1 is a side elevation view of a patient support apparatus.

Referring to FIG. 1, the numeral 10 generally designates a patient support apparatus. In the illustrated embodiment, patient support apparatus 10 is configured as a bed, such as a hospital bed, with head and foot boards 10*a*, 10*b*, side rails (not shown), and an articulating deck 16. However, it should be understood the patient support apparatus 10 may take on other forms, including a stretcher, a cot, or the like. In general, patient support apparatus 10 is used whenever a patient is to be supported and it is desirable to raise and lower the patient relative to a floor surface or other supporting surface. As will be more fully described below, patient support apparatus 10 includes a lift assembly for raising and lowering the patient support apparatus surface, such as a mattress or other cushioning device, which supports a patient thereon, between a fully raised position and a lowermost position, while still leaving clearance sufficient to allow a base of an over bed table or a patient lift to be extended under the patient support apparatus.

Figure 2:
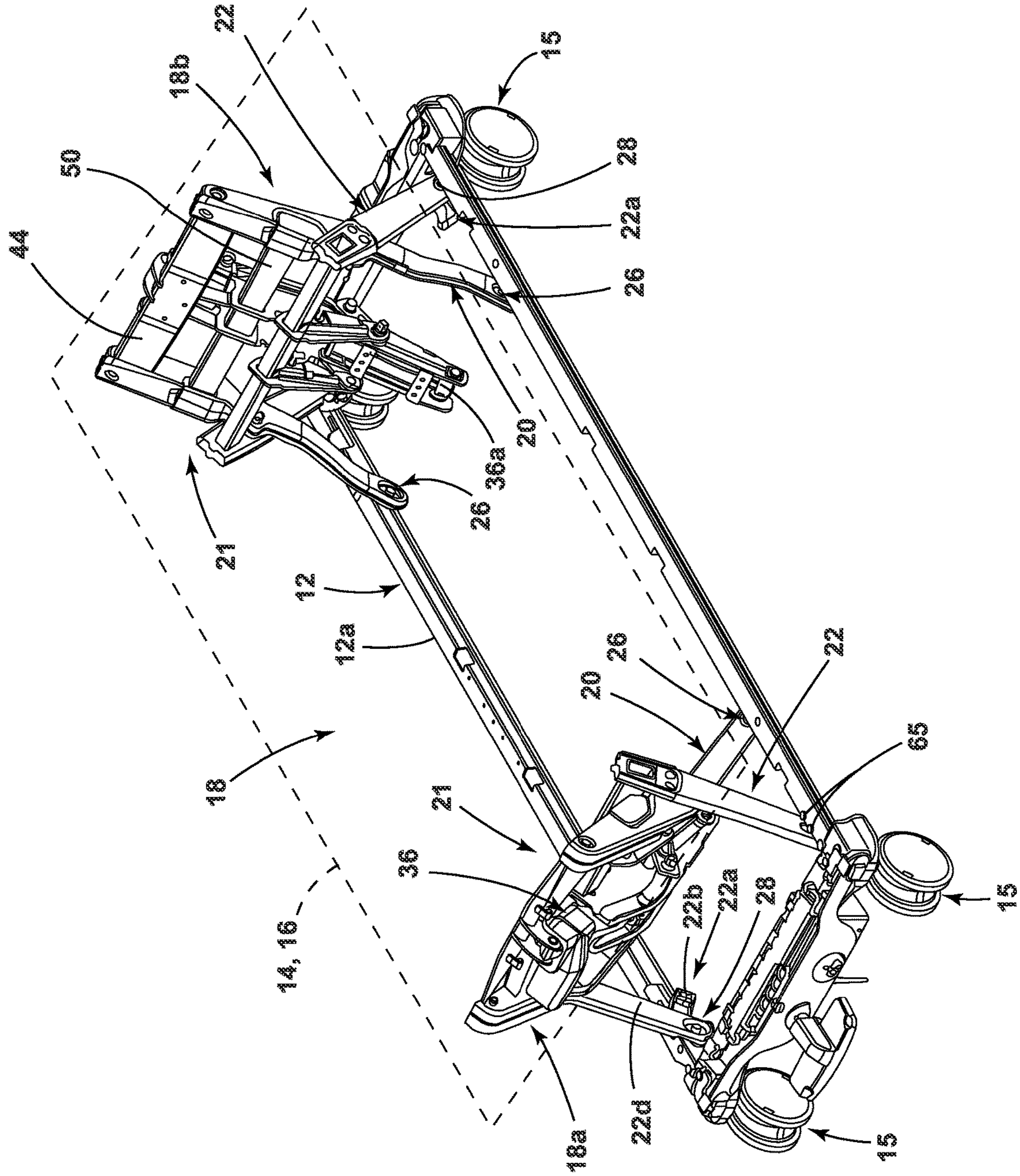
FIG. 2 is a perspective view of the patient support apparatus of FIG. 1 with the deck, frame, headboard, and footboard removed to show the lift assembly in a full height position.

As best seen in FIG. 2, patient support apparatus 10 includes a base 12, a support frame 14 for supporting deck 16 (FIG. 1), and a lift assembly 18 for raising or lowering support frame 14 (and deck 16, see FIG. 1) relative to base 12. It should be understood that frame 14 may also support a load frame beneath deck 16, which is used for mounting sensors, such as load cells, to measure the weight of a patient supported on the deck. However, the load frame may be eliminated and, instead, load cells may be placed in frame 14 due to the reduction of forces, especially the reduction of torque on the frame 14, which is achieved the arrangement of the lift assembly components described more fully below.

As best seen in FIG. 2, base 12 is a wheeled base with a plurality of caster wheels 15 to facilitate movement of the bed across a floor surface. In the illustrated embodiment, again referring to FIG. 1, deck 16 includes a plurality of articulating deck sections 16*a*, 16*b*, 16*c*, 16*d*, and 16*e*. It should be understood, however, that the number of deck sections may vary. Each deck section may be articulated by an actuator (not shown) to raise or lower the deck sections, for example, to orient the deck sections in a flat configuration or in a chair configuration (and various other configurations in between). The construction of any of base 12, support frame 14, the headboard 10*a*, footboard 10*b*, and/or the side rails may take on any known designs, such as, for example, those disclosed in U.S. Pat. No. 7,690,059 issued to Lemire et al., and entitled HOSPITAL BED, commonly assigned to Stryker Corp., the complete disclosure of which is incorporated herein by reference herein in its entirety; or U.S. Pat. No. 8,689,376 entitled PATIENT HANDLING DEVICE INCLUDING LOCAL STATUS INDICATION, ONE-TOUCH FOWLER ANGLE ADJUSTMENT, AND POWER-ON ALARM CONFIGURATION, also commonly assigned to Stryker Corp., the complete disclosure of which is also hereby incorporated by reference herein in its entirety. The construction of any of base 12, support frame 14, the headboard 10*a*, footboard 10*b*, and/or the side rails may also take on forms different from what is disclosed in the aforementioned patent and patent publication.

As will be more fully described below, lift assembly 18 is configured so that actuators with a shorter stroke and consistent force margin ("applied force less actuator capacity") may be used while still being able to lower the deck to a low height position, such as 11 inches off the floor, and to a full height position, such as in a range of 26 to 34 inches off the floor. In other words, the same energy may be applied by better optimizing the force curve. In this manner, lower maximum loads may be applied to the components, such as the weldments forming the leg assemblies. Additionally, this may reduce costs and allow use of a lighter actuator.

Optionally, the actuator may be mounted to reduce, if not eliminate, any side loading on to the lifting legs by providing sufficient play in the actuator mounting arrangement, but no so much play that will induce lateral loads at its rod mounting location. Further, as noted above, the actuators are not mounted to the frame and, instead, are fully contained and mounted in the leg assemblies, as described below, which reduces forces on the frame so that load cells may be mounted to the frame to measure patient weight, as well as movement and patient biometrics.

Figure 4:
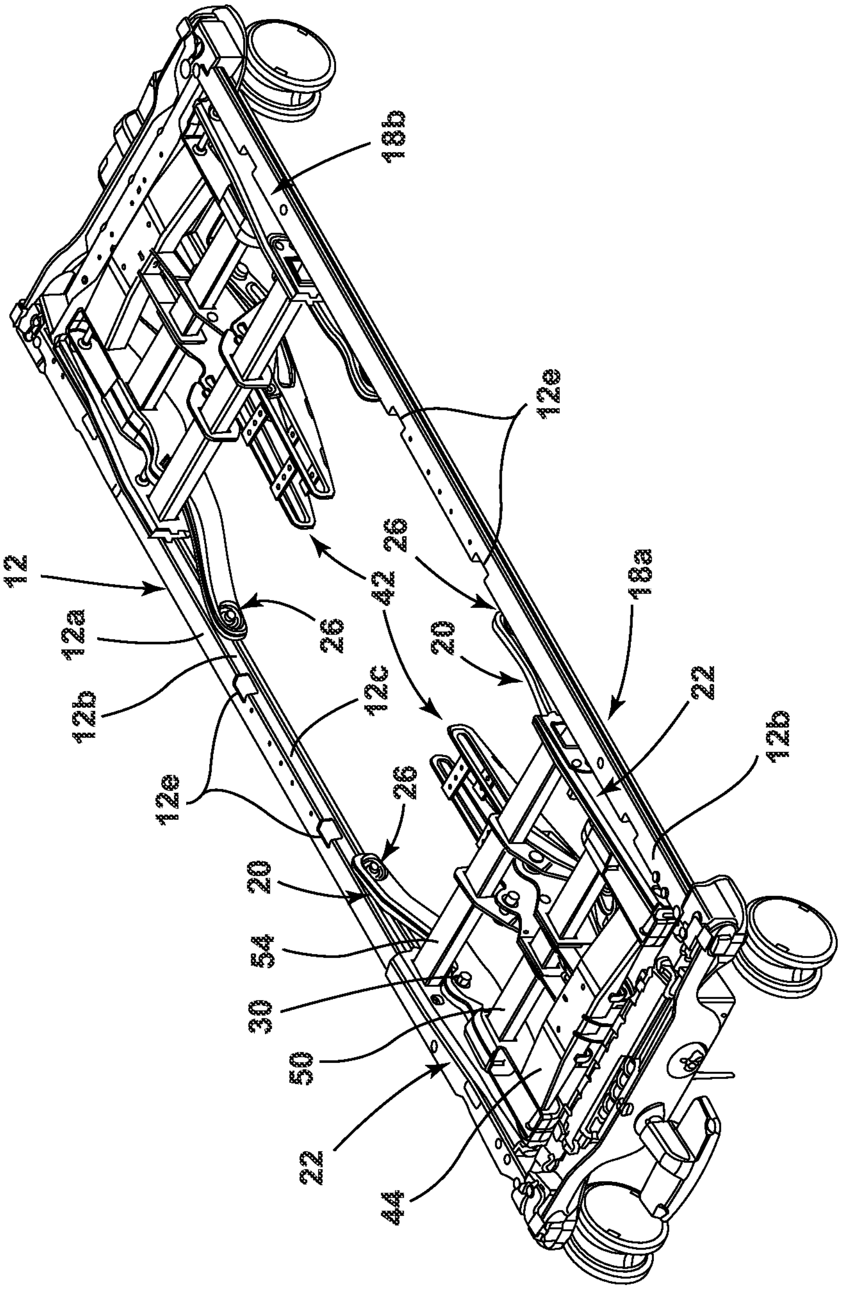
FIG. 4 is another perspective view of the patient support apparatus similar to FIG. 2 illustrating the lift assembly in a lowermost position.
Figure 4A:
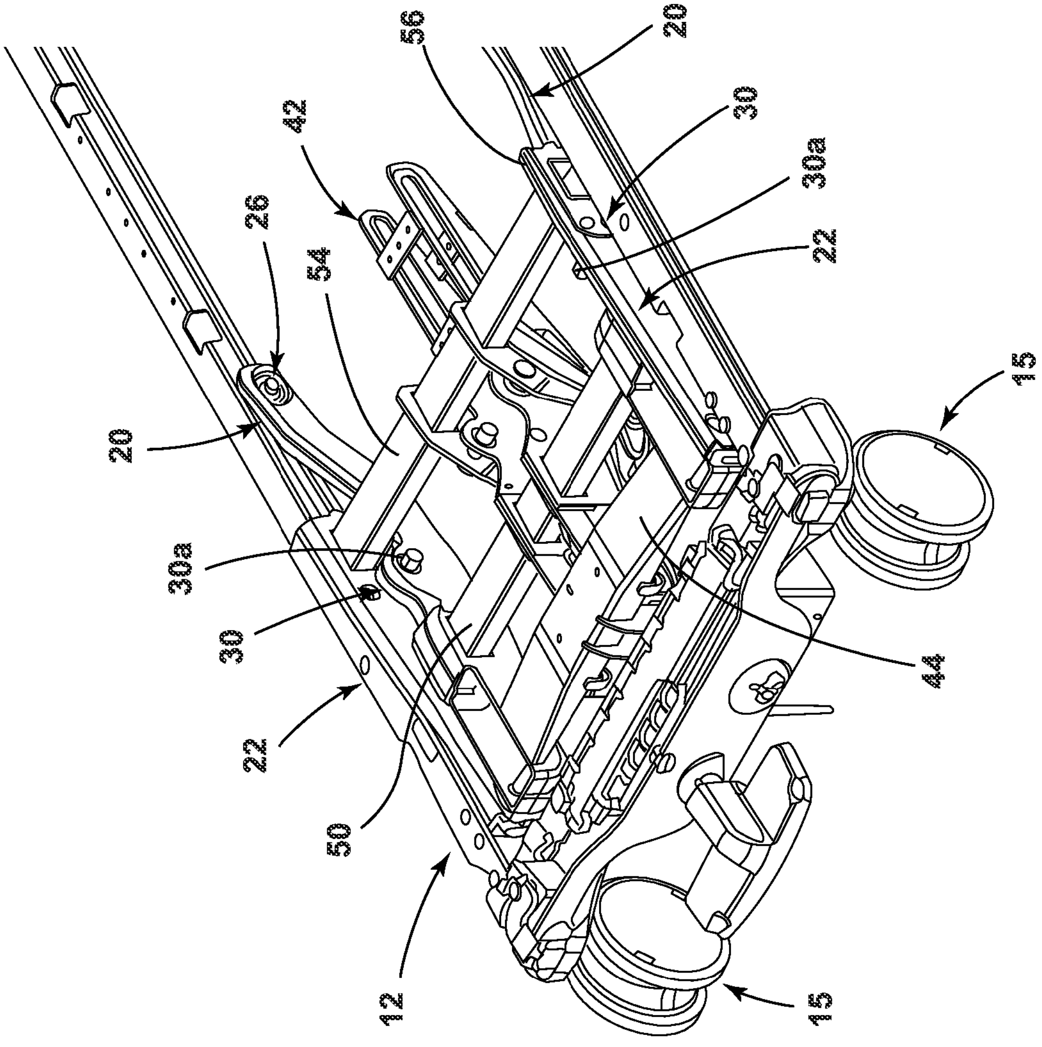
FIG. 4A is an enlarged view of the foot end leg assembly of the lift assembly of FIG. 4.
Figure 8:
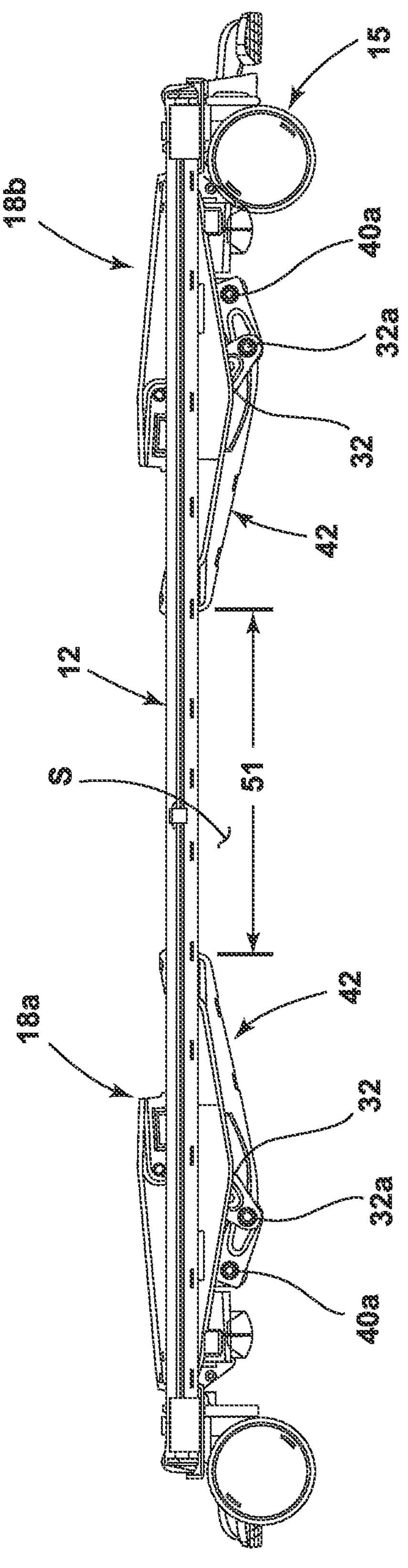
FIG. 8 is a side elevation view similar to FIG. 6 with the lift assembly in its lowermost position.

Additionally, when lift assembly 18 is moved to its lowermost configuration, such as shown in FIGS. 4 and 8, the lift assembly 18 may be substantially contained within base 12 without interfering with the central space S under the base, which may be needed, for example, for mounting a drive wheel and controls for the wheel drive system (such as the ZOOM system sold by Stryker). As such, for example, when lowered, patient support apparatus 10 may be configured so that the central space S under the base is clear at least over a length 51 of about 18 inches. In this manner, patient support apparatus 10 can provide a very low height patient support apparatus, which can reduce the chance of a patient fall, but without eliminating the available space under the base.

Referring again to FIG. 2, lift assembly 18 includes a head end lift assembly 18*a* and a foot end lift assembly 18*b*, which may be substantially mirror images of each other and mounted adjacent the respective head and foot ends of the frame 14. For ease of description, many of the following details are made in reference to the head end lift assembly 18*a*, with the understanding that the same details apply to the illustrated foot end lift assembly 18*b*, which is shown as a mirror image and numbered with the same numbers as the head end lift assembly. However, it should be understood that the head end and foot end lift assemblies may have different configurations.

Figure 1A:
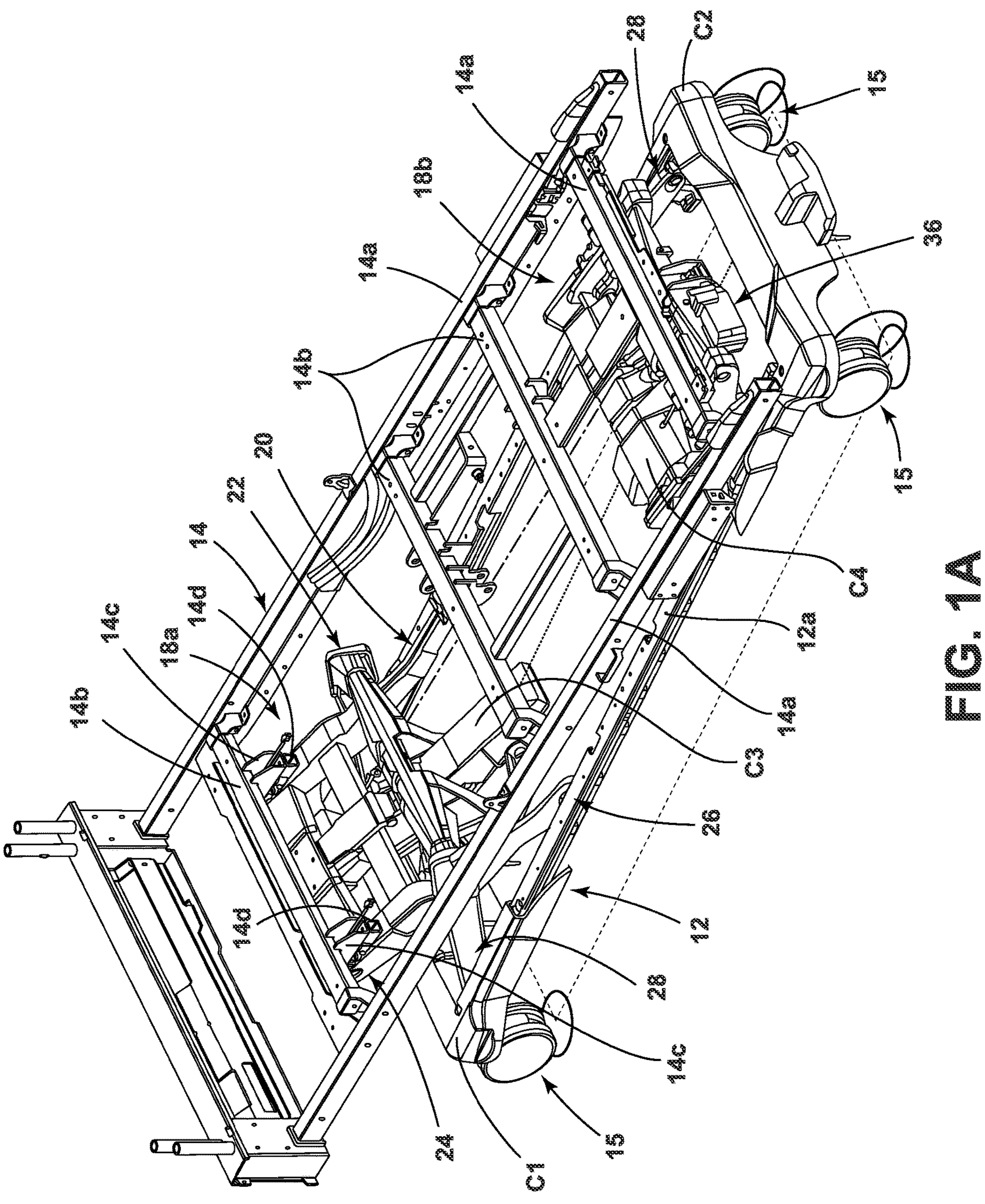
FIG. 1A is a perspective view of the patient support apparatus of FIG. 1 with the deck, headboard, and footboard removed to show the mounting arrangement of the lift assembly.
Figure 1B:
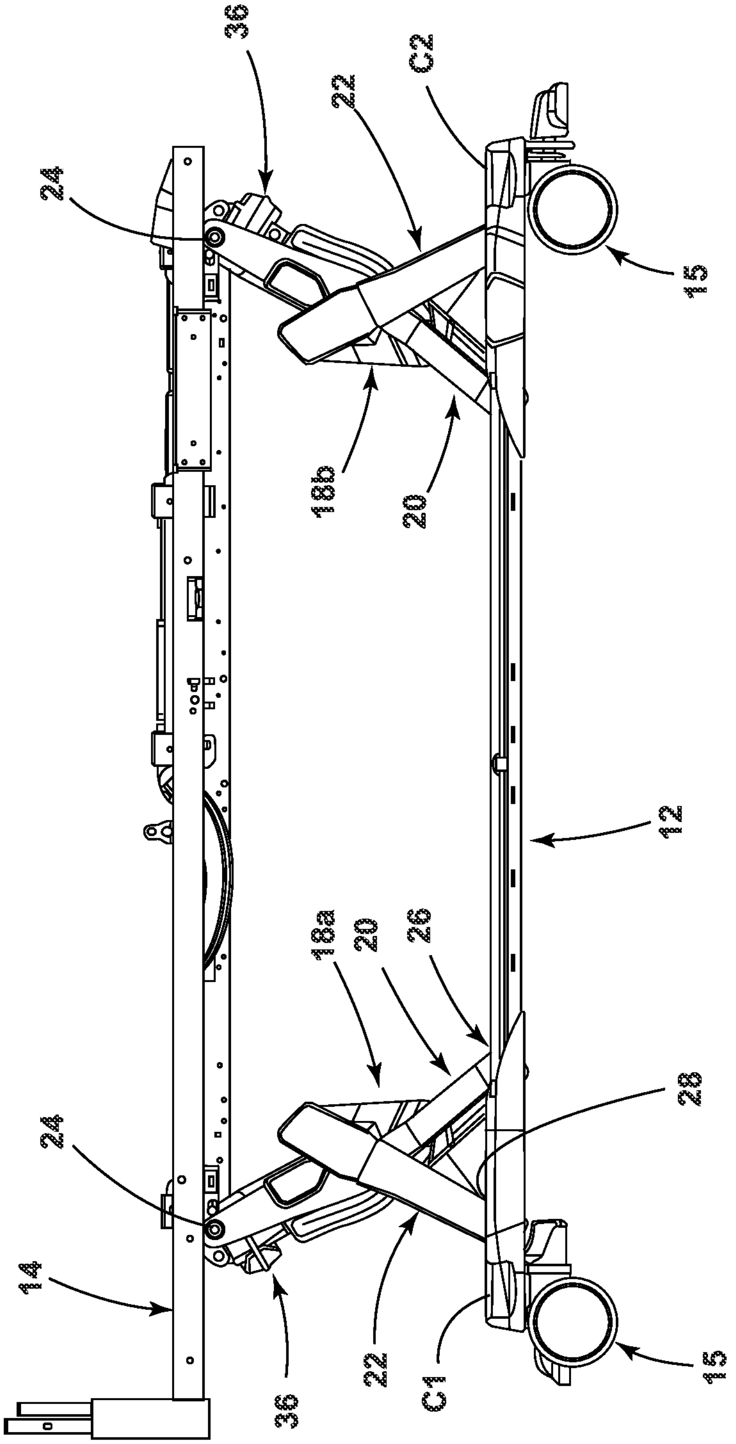
FIG. 1B is a side elevation view of the patient support apparatus of FIG. 1 with the deck, headboard, and footboard removed to show the mounting arrangement of the lift assembly.
Figure 9:
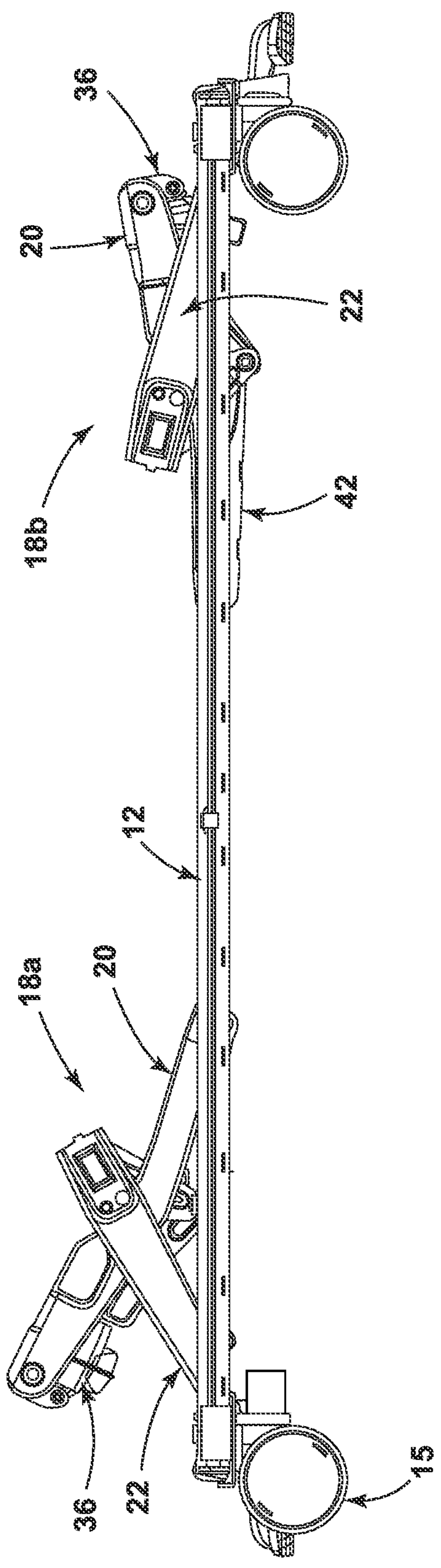
FIG. 9 is a side elevation view similar to FIG. 6 with the lift assembly in its Trendelenburg position.
Figure 12:
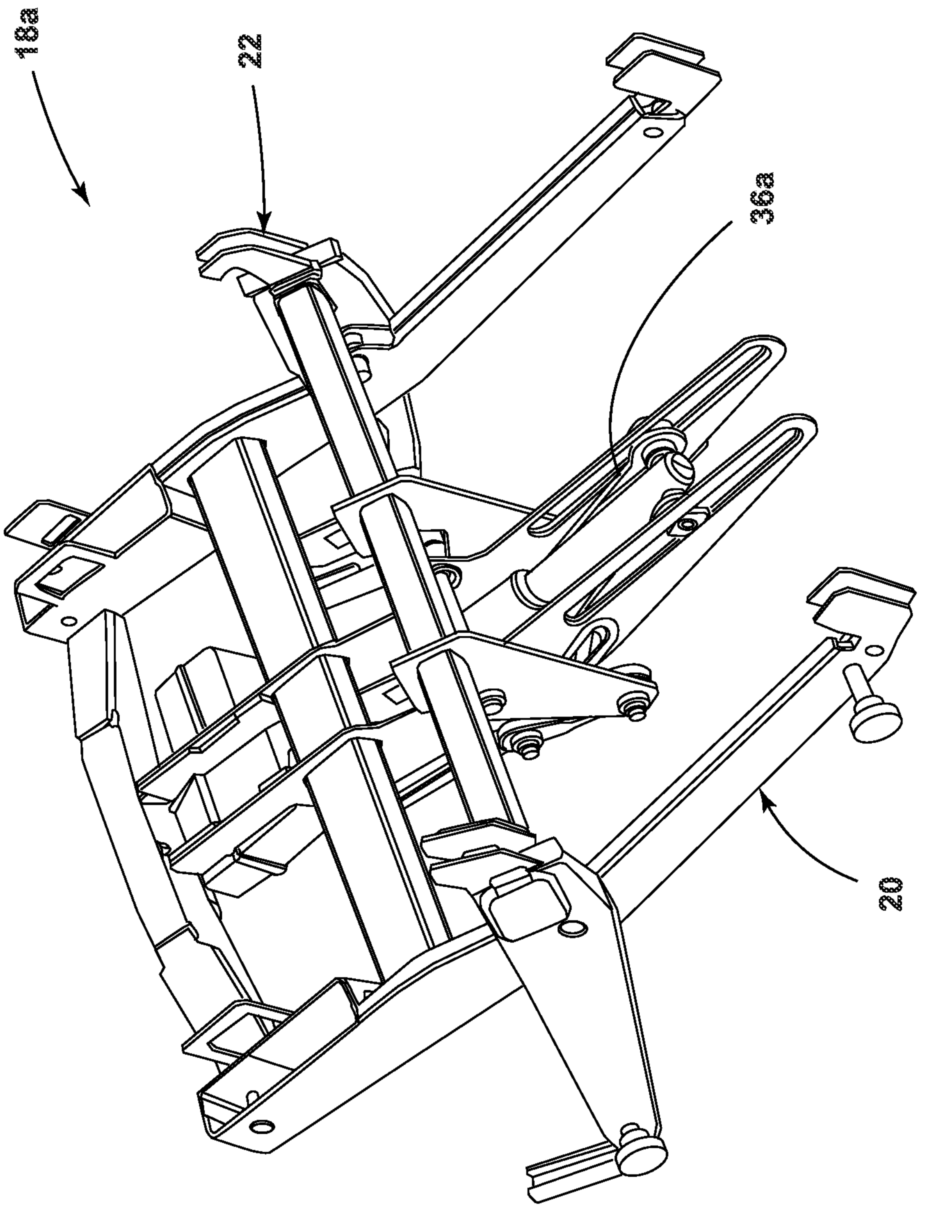
FIG. 12 is an enlarged perspective view of one of the leg assemblies and actuator of the lift assembly.
Figure 12A:
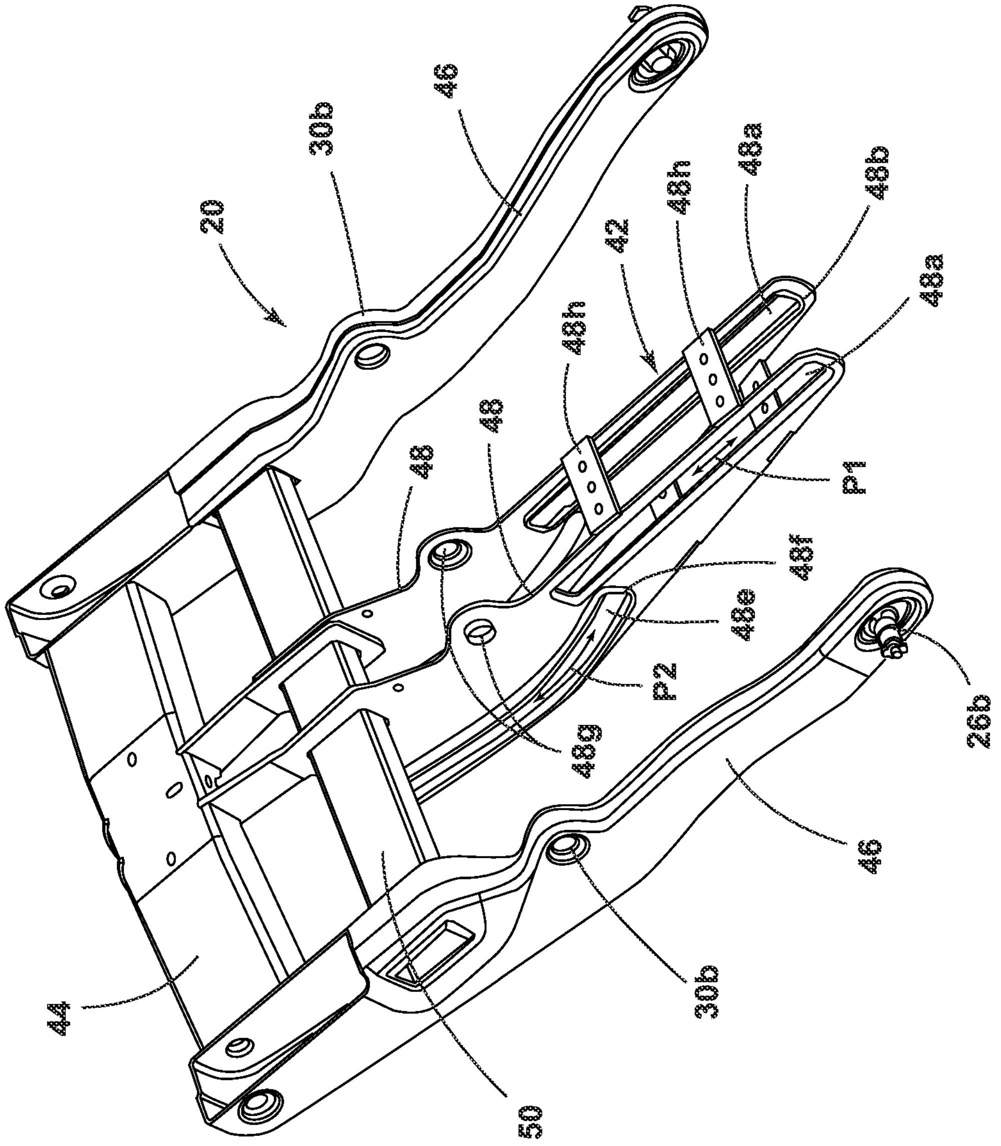
FIG. 12A is an enlarged perspective view of one of the lifting legs of the lift assembly.

As best seen in FIG. 1A, frame 14 includes a pair of longitudinal frame members 14*a* and a pair of transverse frame members 14*b*, which connect longitudinal frame members 14*a* to form the frame. Referring to FIGS. 2, 2A, 3, 3A, 4 and 4A, head end lift assembly 18*a* includes a first lifting leg 20 and a second lifting leg 22, which are pivotally joined by pivot connections 30 (best seen in FIG. 3A) to form a folding leg assembly 21. Pivot connections 30 are formed by pins 30*a* (FIG. 9F) that pivotally join first lifting leg 20 with second lifting leg 22 via openings 30*b*, 30*c* (see FIG. 12A and 12C) formed in the respective legs 20, 22.

First lifting leg 20 is pivotally mounted at its upper end to support frame 14 at pivot connections 24 (FIG. 1A) formed by a pair of pins that are pivotally mounted to frame 14 such as by pivot blocks 14*d*, which are mounted to transverse frame members 14*b* of frame 14 via brackets 14*c*. Optionally, pivot connections 24 may be formed by a single pivot rod 24*a* (shown in phantom in FIG. 2A) that extends transversely beneath upper transverse frame member 44 (described below) and into the upper ends of leg 20 to extend through pivot blocks 14*d*, which as described below nest in the upper end of legs 20 when the lift assembly is lowered folded. Optionally, rod 26*a* may be supported by intermediate brackets 24*b* (FIG. 2A) mounted to the underside of frame member 44.

Lifting leg 20 is pivotally mounted at its lower end to base 12 at sliding pivot connections 26, such as by the pivot blocks 60 (described more fully below). Second lifting leg 22 is pivotally mounted at its lower end to base 12 at pivot connections 28 and pivotally mounted adjacent its upper end to the medial portion of lifting leg 20 by pivot connections 30. In this manner, when legs 20 and 22 are unfolded about pivot connections 30 they form an inverted Y shaped frame and when folded are generally arranged in flattened configuration (see FIG. 4). Further, as will be more fully described below, when folded, the legs 20 and 22 may be arranged in base 12 so that the deck 16 may be lowered to a height H of less than 12 inches off the surface on which the base is supported. Optionally, also more fully described below, when folded, second lifting leg 22 may provide a bearing surface, for example, in the form of a stop 22*a* (see FIG. 1), for lifting leg 20 so that the load of the frame and deck may be directly transmitted to the base 12 via pivot connections 26 and 28.

As will be more fully described below, lift assembly 18*a* (as well as lift assembly 18*b*) includes an actuator 36, in the form of a linear actuator, such as a pneumatic, electric or hydraulic actuator. As will be more fully described below, upper end (fixed base 36*d*, e.g. FIGS. 2A and 3) of head end actuator 36 is mounted to the upper end of first lifting leg 20, for example by a pivot connection 37*a* and bracket 37*b*, and, further, mounted at its opposed end via sliding pivot connection 37*c*, also to first lifting leg 20. In this manner, when extensible rod 36*a* extends, it is extended along an axis 36*b* that is fixed relative to first lifting leg 20 (further details are provided below). In other words, the actuator does not pivot relative to the first lifting leg 20 and, instead, optionally extends generally parallel to lifting leg 20 (e.g. at least the upper linear portion of leg 20, see below for further details on the optional construction of first lifting leg 20).

In order to translate the linear motion of the actuator 36 into pivotal motion of second lifting leg 22 (and hence lifting motion of lift assembly 18*a*), lifting leg 22 is coupled to the actuator via a link and crank arm arrangement. Further, as will be more fully described below, the link and crank arrangement may be configured to tailor the force curve of the lift assembly to closely match the allowable force of the actuator.

For example, in one embodiment, the actuator and link and crank arm arrangements in the lift assembly are configured to produce a maximum force F1 to occur when raising the frame 14 after the lift assembly 18 has been raised from its lowermost configuration. Referring to FIG. 9H, the maximum force F1 may occur approximately at mid-stroke of the lift assembly. Further, the actuator, link and crank arms are mounted in the leg assembly 21 with a mounting configuration to produce a starting force SF wherein the starting force SF is in a range of 95% to 99% of, 96% to 98% of, or about 97% of the maximum force F1 (see FIG. 9H). As a result, the actuator may have a shorter stroke size than normally would otherwise be used, and moreover, may have a consistent force margin, with the force margin varying from about 1500 Newtons to about 3000 Newtons (see FIG. 9H).

Further, in so doing, the speed of the lifting of the deck is more uniform throughout its range of motion, which is more comforting to a patient supported thereon. For example, the speed of the actuator over its full range of motion may be more consistent and may range from about 0.7 to 1.3 dist/time. It should be understood that the speed will vary due to the weight of the patient supported thereon and the capacity of the selected actuator.

In the illustrated embodiment, and referring to FIGS. 9A-9G, second lifting leg 22 is coupled to actuator 36 via a pair of crank arms 32 and via links 38, 40. Each crank arm 32 is fixed mounted at its upper end to second lifting arm 22 and pivotally coupled by a pivot connection 32*a* at its lower end to a respective link 40. In turn, each link 40 is pivotally coupled to link 38 via a pivot connection 40*a*. Additionally, link 38 is pinned at its opposed end to actuator 36 via a transverse pin 36*c* mounted in the distal end of rod 36*a* of actuator 36. Therefore, the distal end of link 38 is extended along axis 36*b* as rod 36*a* extends or retracts along axis 36*b*. Additionally, pin 36*c* and the distal end of link 38 move in a linear path P1, described more fully below. Optionally, the distal end of link 38 may have a slotted opening 38*a* formed therein for receiving pin 36*c* to help offload forces on the actuator at the low height, as more fully described below in reference to stop 22*a*.

Figure 9A:
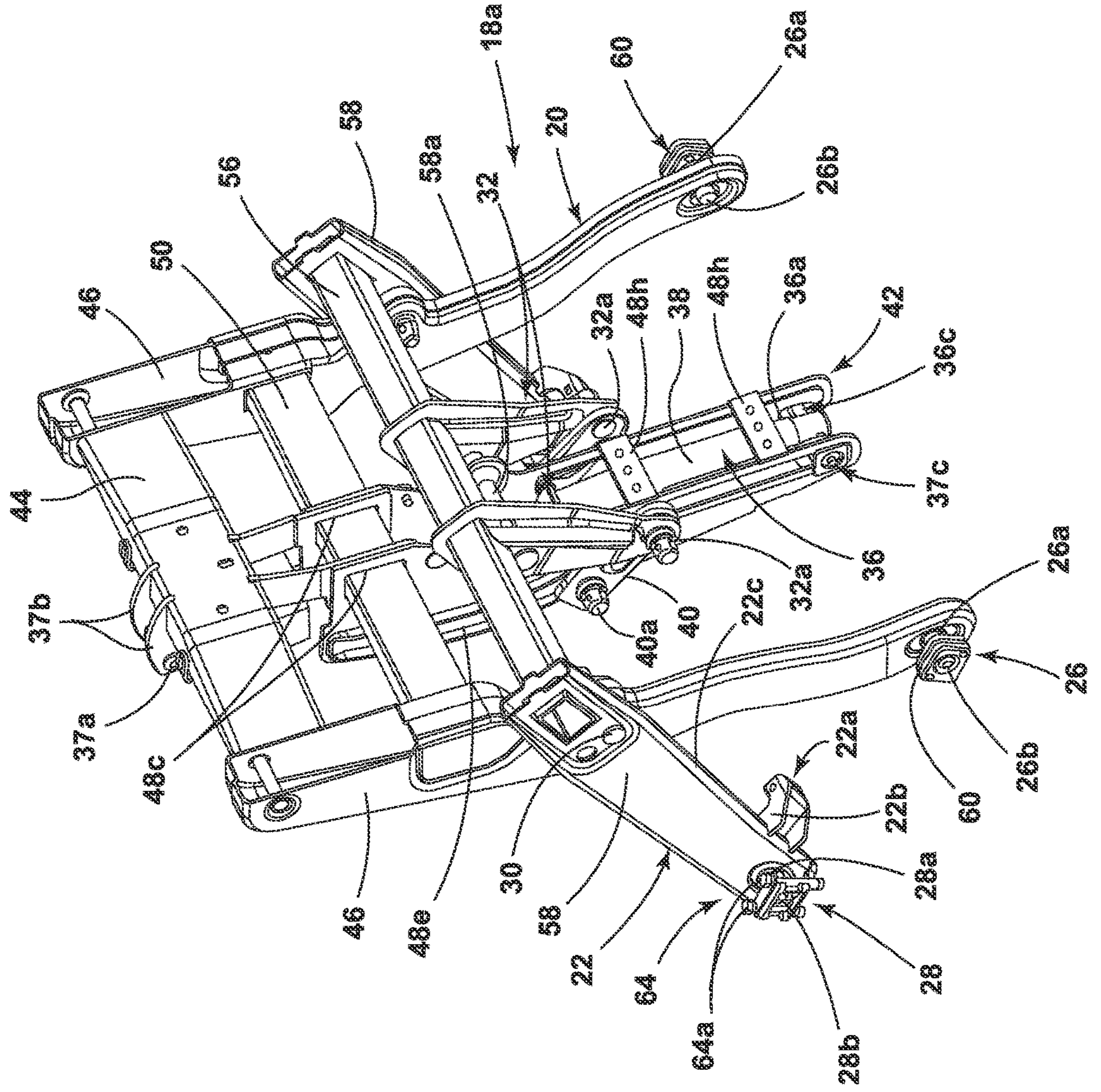
FIG. 9A is an enlarged perspective view of the lift assembly.
Figure 9B:
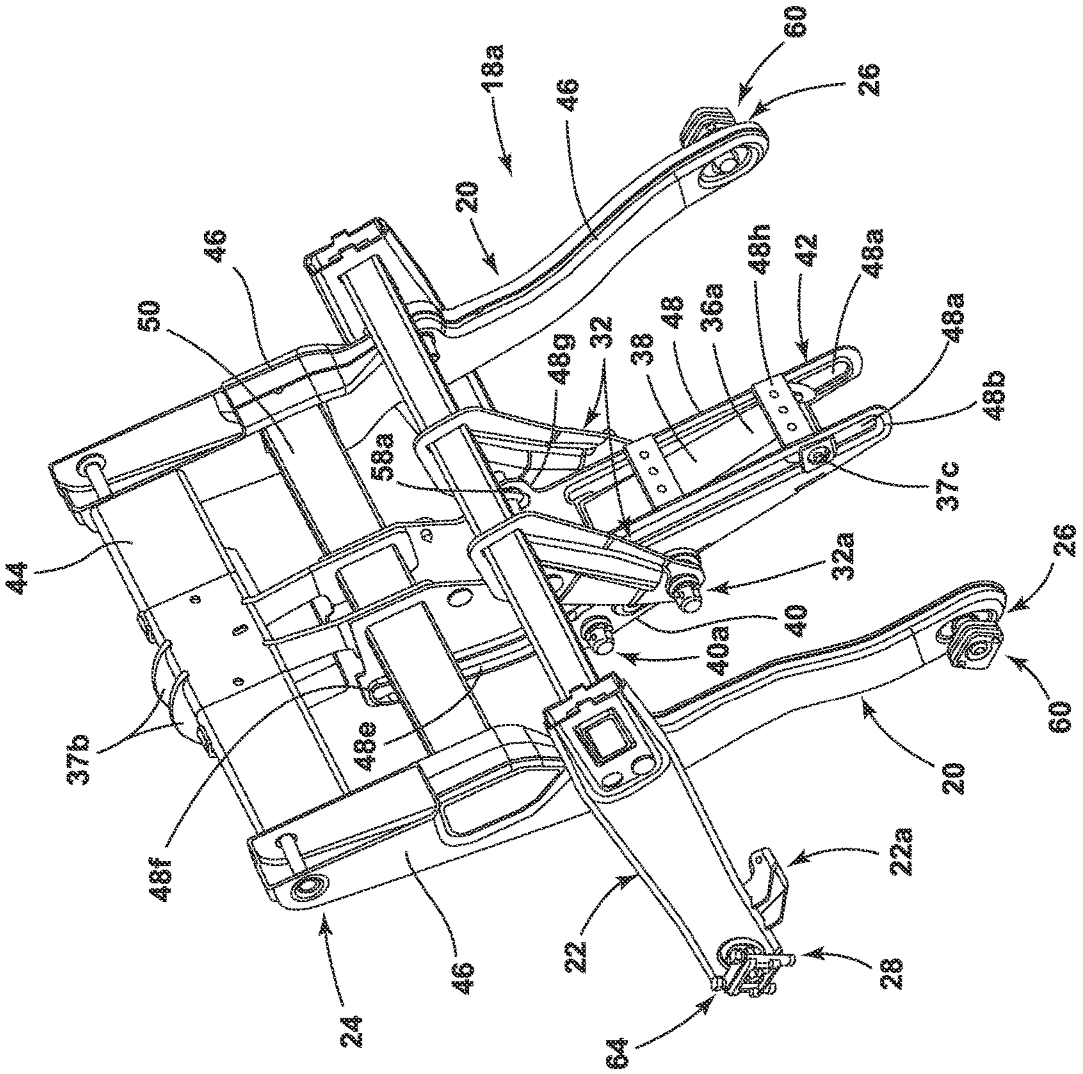
FIG. 9B is an enlarged perspective view of the lift assembly.
Figure 9C:
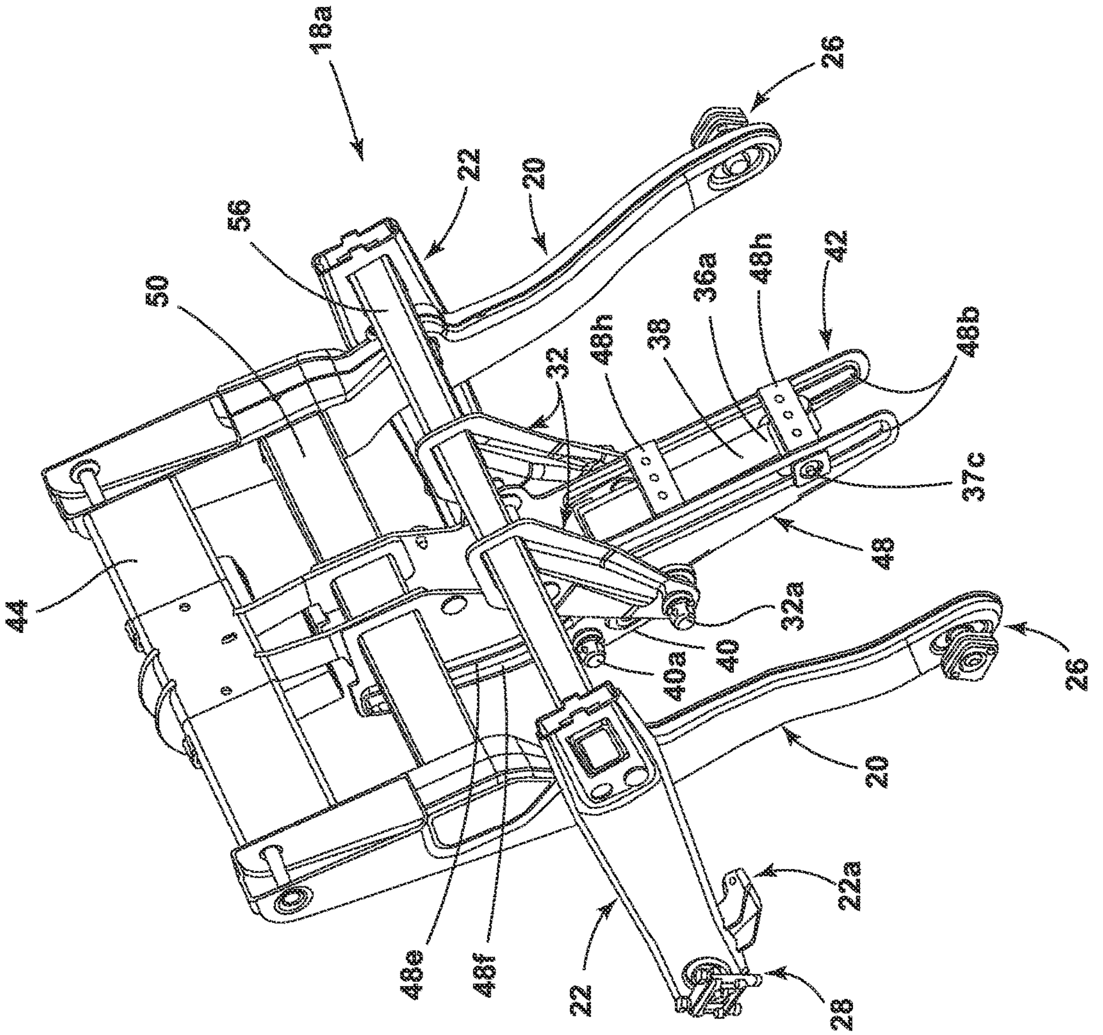
FIG. 9C is an enlarged perspective view of the lift assembly with actuator removed.
Figure 9D:
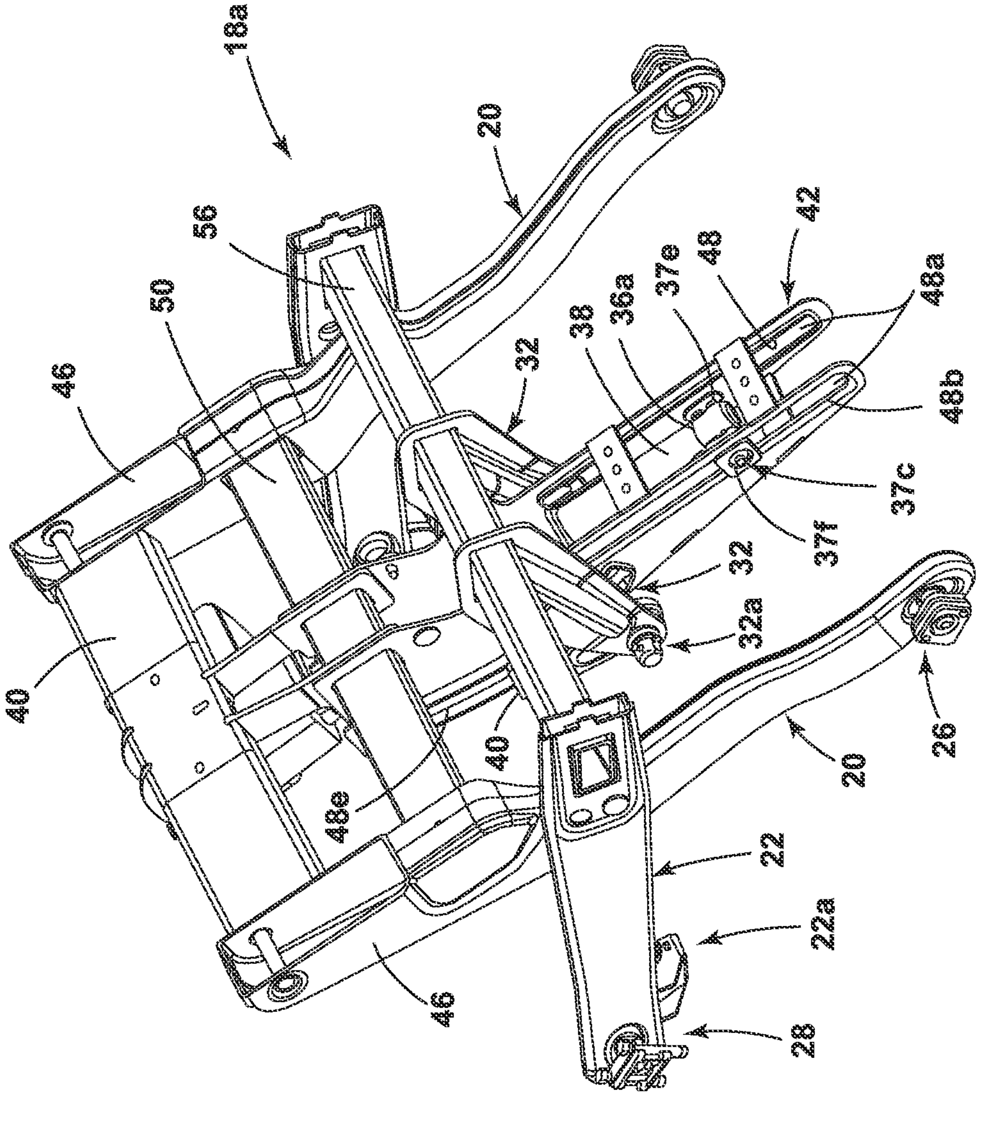
FIG. 9D is an enlarged perspective view of the lift assembly with actuator removed.

As best seen in FIGS. 9A-9C, link 38 extends rearwardly from pin 36*c* toward the fixed based 36*d* of actuator 36. Further, link 38 forms an acute angle with respect to rod 36*a* through its full range of motion, described below, while it distal end moves along path P1. The opposed, proximal end of link 38 (at pivot connection 40*a*) is guided along a non-linear path P2 (see FIG. 9E-9G and 1A) that at least initially diverges away from the linear path P1 of pin 36*c*, or in other words away from axis 36*b*. As noted above the rod 36*a* of actuator extends along an axis 36*b* that is fixed and generally parallel to at least the linear portion of lifting leg 20. As such, when rod 36*a* is extended, link 38 will become a tension driver link that pulls pin 40*a*' of pivot connection 40*a* along path P2, which in turn pushes on links 40. Links 40 in turn push on crank arms 32, which apply a moment to second lift legs 22 to cause them to rotate counter clockwise (as view in FIG. 9A, e.g.) about pivot connections 30 and unfold leg assembly 21 until pin 40*a*' of pivot connection 40*a* reaches the end of path P2. In reverse, as would be understood, when rod 36*a* is retracted, link 38 will become a compression driver link that pushes pin 40*a*' along path P2 (toward fixed based 36*d* of actuator 36), which in turn pulls on links 40. Links 40 then in turn pull on crank arms 32, which apply a moment to second lift legs 22 to cause them to rotate clockwise (as view in FIG. 9E) about pivot connections 30 and fold leg assembly 21 until pin connection 40*a* reaches the other end of path P2. As would be understood, the path P2 may extend beyond the path of the pivot connection 40*a* so that the end of the path of the pivot connection 40*a* is defined by the actuator 36 rather than a hard stop on either end of path P2.

To retain the rod 36*a* of actuator 36 along its fixed linear path, first lifting arm 20 includes a track 42 extending therefrom along axis 36*b*, which guides the rod 36*a* of actuator 36 when extending or retracting. In the illustrated embodiment, track 42 is formed form a pair of opposed plates 48, such as stamped plates, with elongated slots 48*a* for guiding pin 36*c* of rod 36 along its linear path P1 along axis 36*c*. Optionally, as more fully described below, plates 48 may be configured to provide a bearing surface 48*b* along edges of slots 48*a* for pin 36*c* to reduce slop and play and provide a tighter assembly. For example, bearing surfaces 48*b* may be provided by lips formed in plates 48 along at least the lower edge of slot 48*a*, but which may extend around the full perimeter of the slot to reinforce the plate at the slot location.

In the illustrated embodiment, referring to FIG. 9A, first lifting leg 20 is formed from an inverted U-shape frame with a transverse upper frame member 44 and two depending frame members 46, which are joined together such by as welding. Actuator 36 is mounted to lifting leg 20 between frame members 46 with its upper end mounted to transverse frame member 44 by a pivot connection 37*a*. Pivot connection 37*a* may be formed by a bracket 37*b*, such a pair of plate brackets attached, such as by welding, to transverse frame member 44.

Figure 2A:
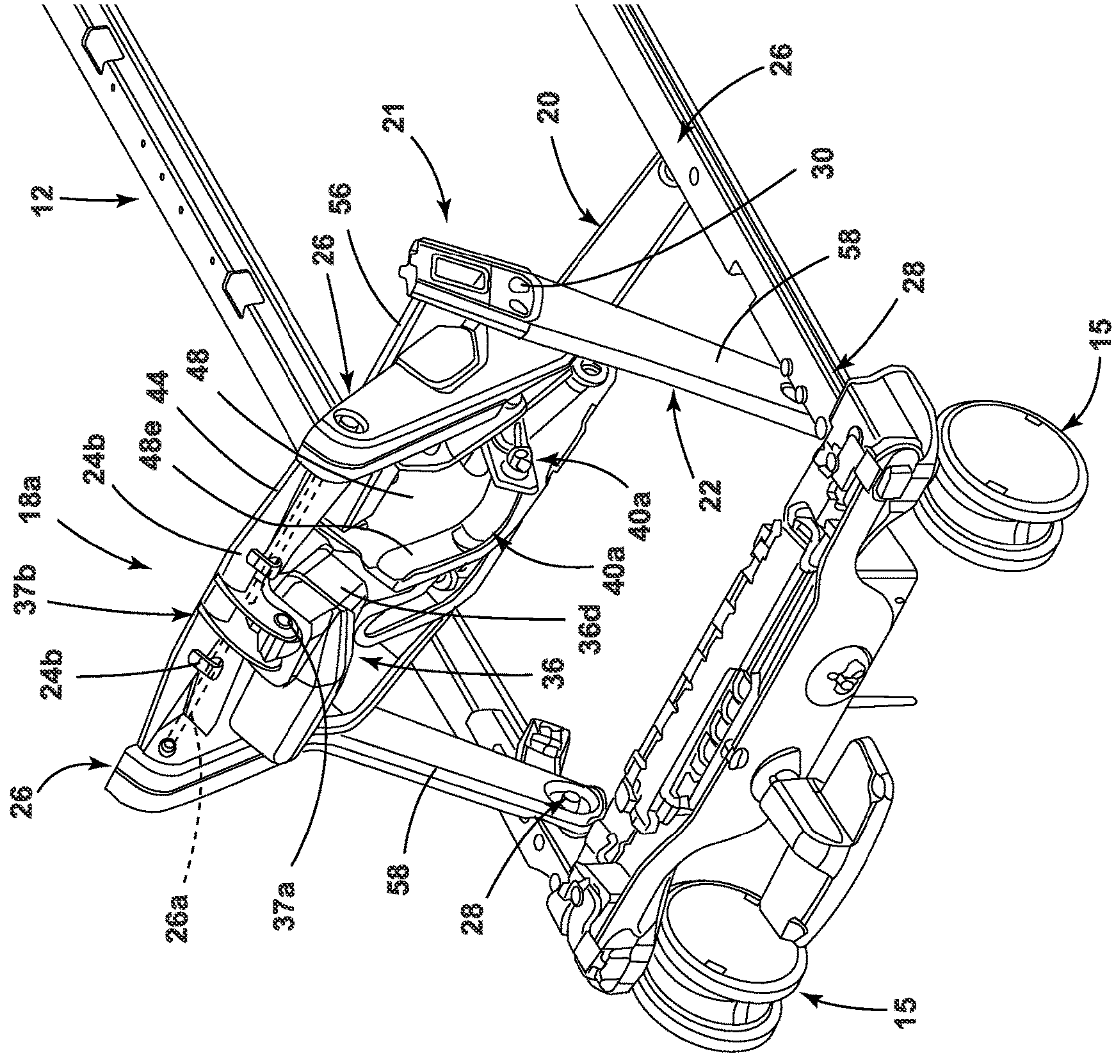
FIG. 2A is an enlarged view of the foot end leg assembly of the lift assembly of FIG. 2.

Tracks 42 (which as noted guide the extension of rod end 36*a* along axis 36*b*) extend from transverse upper frame member 44 and are supported and rigidly mounted (e.g. by welds) at one end to transverse frame member 44 (see FIGS. 9A and 2A). Tracks 42 are also supported and mounted to a second transverse frame member 50. Transverse frame member 50 is spaced from transverse frame member 44 and rigidly mounted, for example by welding, between frame members 46 and provides rigidity to frame members 46, in addition to providing support to tracks 42.

In the illustrated embodiment, second lifting leg 22 may also be formed from an inverted U-shaped frame with an upper transverse member 56 and two depending frame members 58, which are joined together, for example by welding. Depending frame members 58 straddle frame members 46 of first lifting leg 20 and are each pivotally joined thereto by pivot connections 30. Transverse frame member 56 supports and provides a mount for crank arms 32, which are rigidly attached to transverse frame member 56, for example, by welding, and which straddle tracks 42.

As best seen in FIGS. 9A-9G, each plate 48 that forms tracks 42 is supported and mounted to transverse member 44 and to transverse member 50, for example, by welding. In the illustrated embodiment, transverse member 50 passes through openings 48*c* formed in plates 48 and is welded to the plates 48 about openings 48*c*, which are commensurate in size to the transverse member 50. Similarly, the upper end of plates 48 have notches 48*d* (FIG. 12B) formed therein sized to receive transverse member 44 therein so that transverse member 44 can be welded to the respective plates 48 around the respective notches. Optionally, the ends of plates 48 may extend to form bracket 37*b*.

Path P2 may also be formed by a pair of slots 48*e* to guide pivot connections 40*a*. Slots 48*e* may also be formed in plates 48 and also include bearing surfaces 48*f* for the pin 40*a*' of pivot connections 40*a* to thereby reduce slack and hence increase the tightness of the movement of the lift assembly. Similar to bearing surfaces 48*b*, bearing surfaces 48*f* may be provided by a lip or lips formed in plate 48 along at least the lower edge of slot 48*e*, but which may extend around the full perimeter of the slot 48*e* to reinforce the plate 48 at the slot location.

Figure 9E:
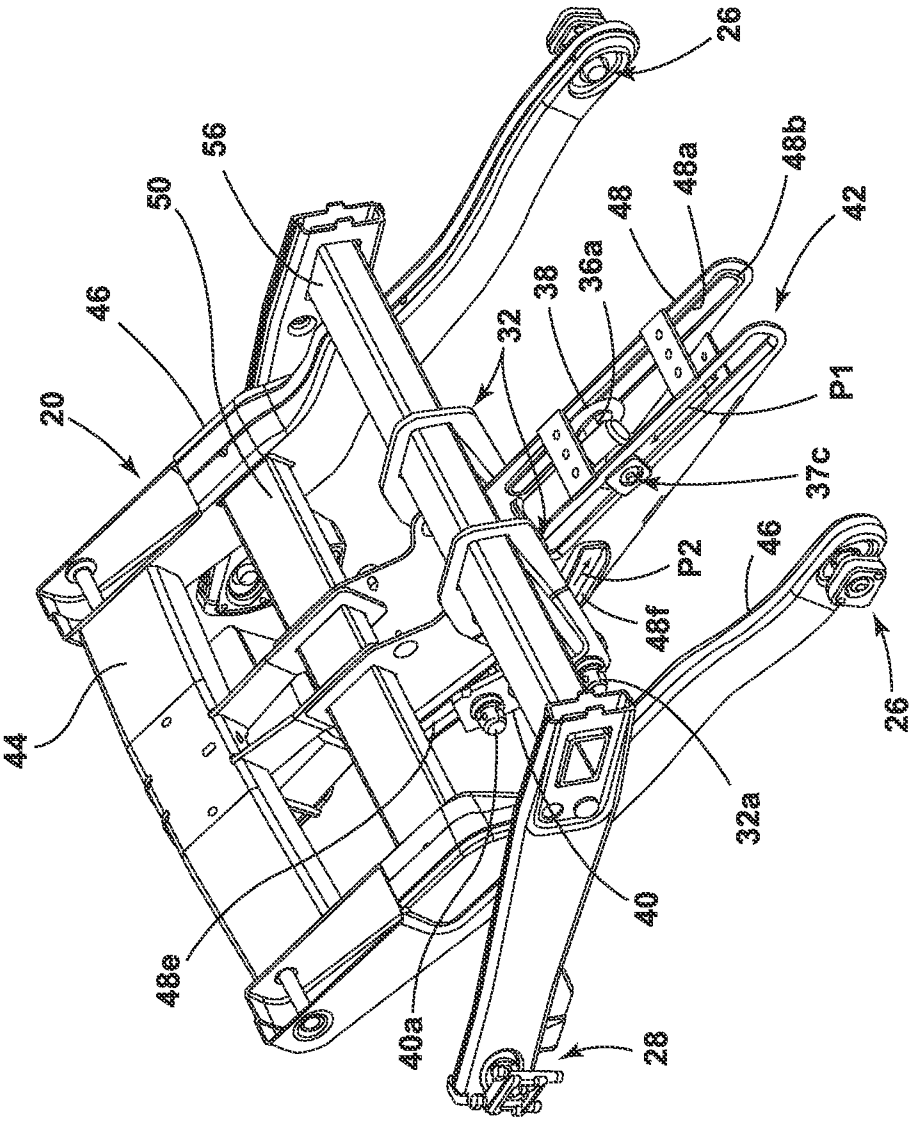
FIG. 9E is an enlarged perspective view of the lift assembly with actuator removed.
Figure 9F:
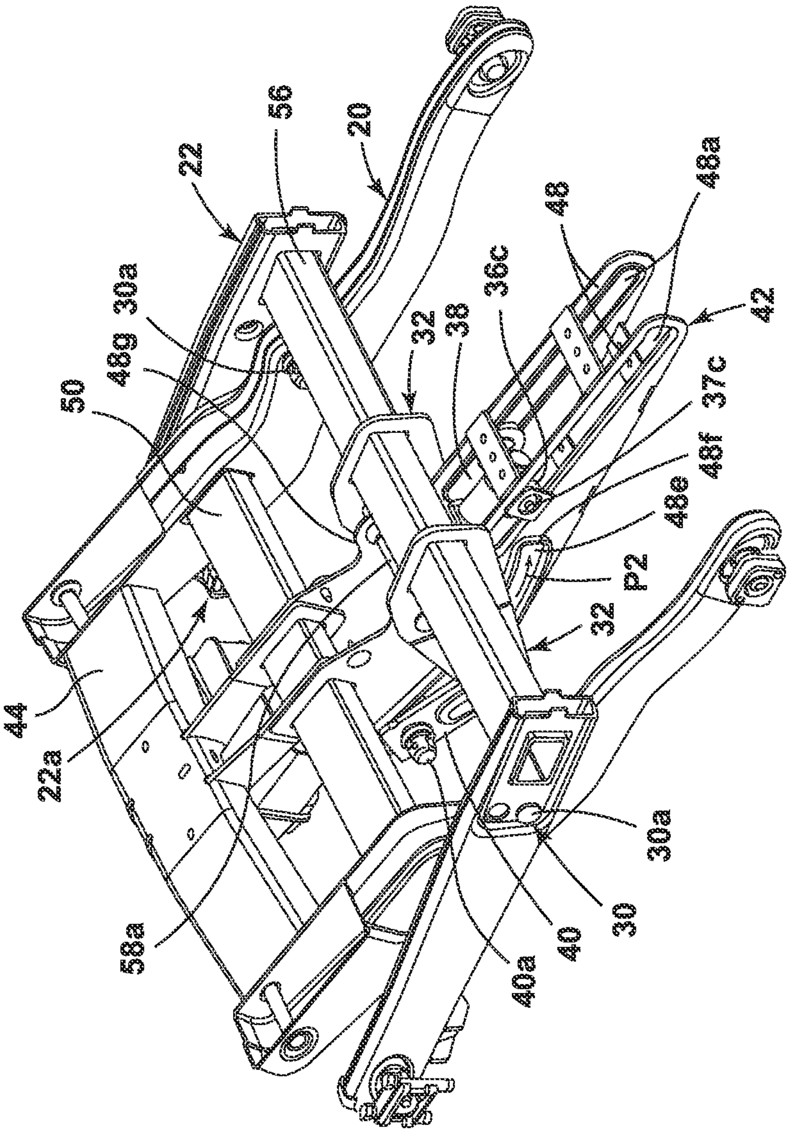
FIG. 9F is an enlarged perspective view of the lift assembly with actuator removed.
Figure 9G:
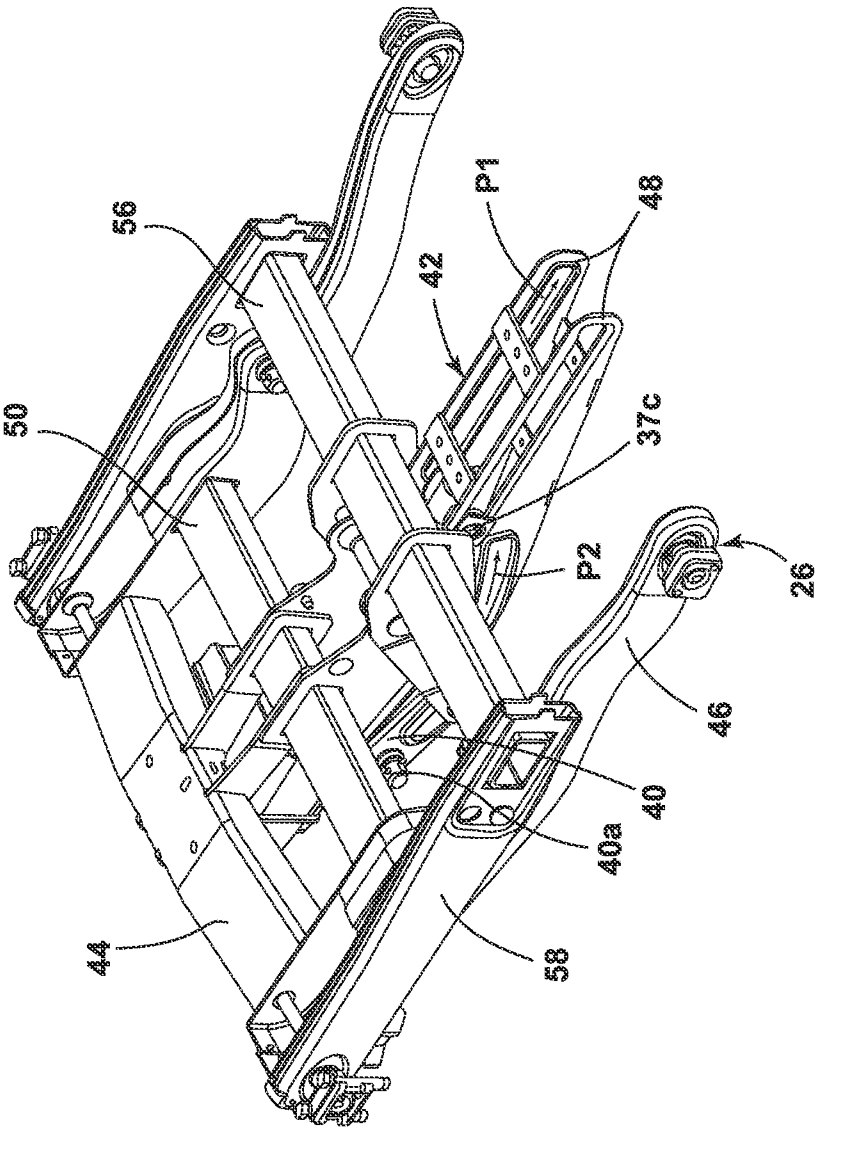
FIG. 9G is an enlarged perspective view of the lift assembly with actuator removed.
Figure 9H:
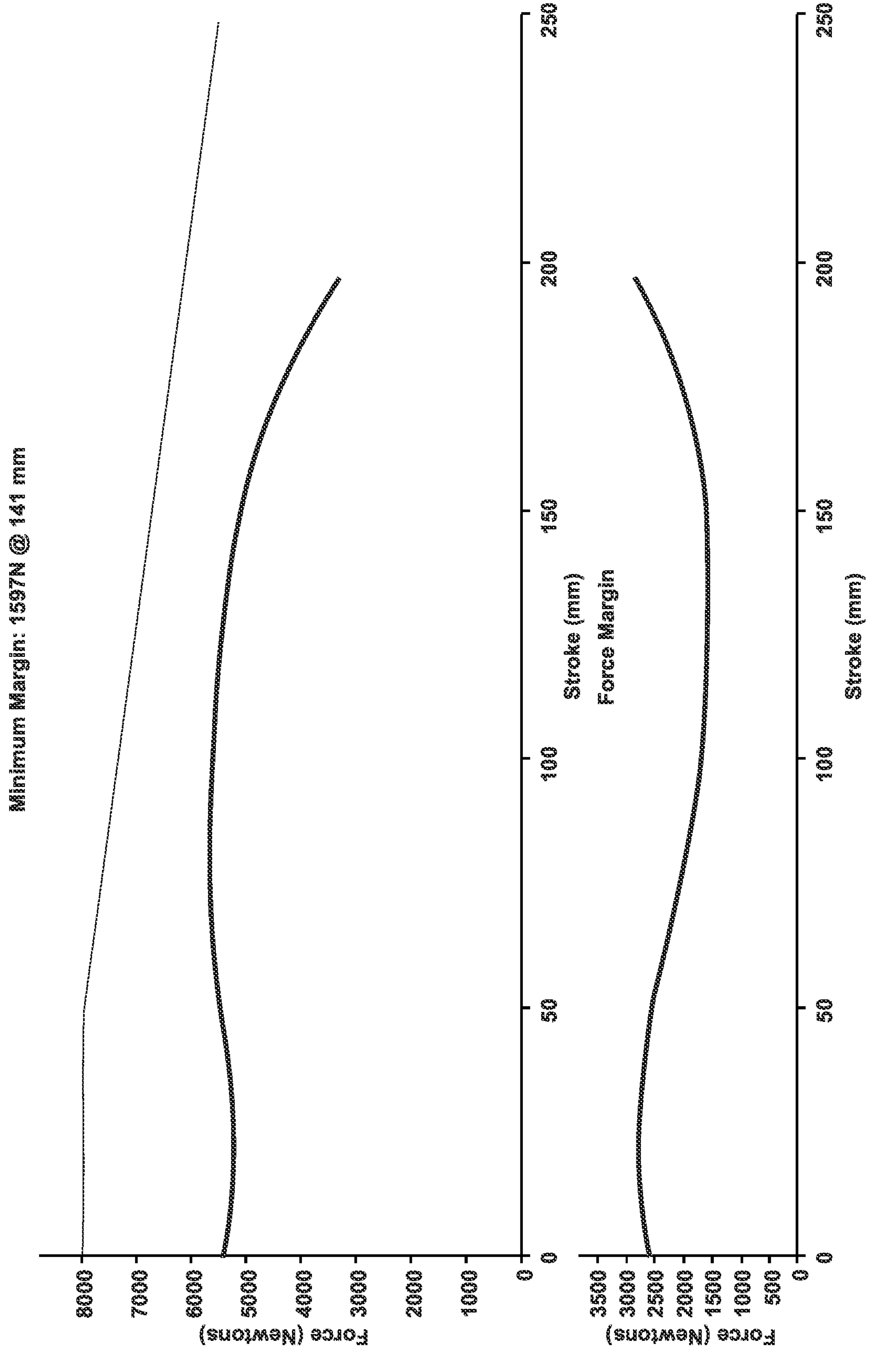
FIG. 9H are graphs of the force and force margin versus stroke of the actuator.

As best seen in FIG. 9E, the lips that form bearing surfaces 48*b* and 48*f* may extend in opposed directions from each other—that is bearing surfaces 48*b* are formed on a lip(s) that extend from the inner side of plates 48, while bearing surfaces 48*f* are formed on a lip(s) that extend from the outer side of plates 48.

To guide pivot connection 40*a* and link 38, and hence crank arm 32, in the desired path, each slot 48*e* may be non-linear. Each slot 48*e* includes a first curved portion that is located approximately at the distal end of the slot 48*e* closest to the end of the rod 36. The first curved portion forms the portion of the path P2 that initially diverges away from path P1 (and hence away from axis 36*b*). The second portion of slot 48*e* may be linear but is angled upwardly toward axis 36*b* and extends from the first curved portion toward to the proximal end of the slot 48*e* (end closest to the fixed body 36*c* of actuator 36).

In this manner, when rod 36*a* is fully extended and leg assembly 21 is fully raised, and then actuator 36 is retracted, links 38, now acting as compression links, will push pivot connections 40*a* along the first curved portion of path P2, which will pull links 40 and cause links 40 to increase their angle with respective to crank arms 32 while pulling on crank arms 32. This increase in angle increases as the pivot connections 40*a* move along the curved portion due to the diverging angle of path P2 from path P1, which increases their leverage on crank arms 32. As the rod 36*a* continues to retract, pivot connections 40*a* will continue to move along path P2 where links 40 and crank arms 32 increase their angular separation. This increase in angular separation increases the leverage of links 40 to pull on crank arms 32 until the legs are fully folded and in their lower most positions where links 40 can exert their maximum leverage. At the lowermost position, this is normally where the greatest torque is required due to the greatest separation of pivot connections 26, 28. However, with the present configuration, at this point, the force needed by the actuator 36 to move second leg 22 is not the maximum and, instead, is less than the maximum force due to the increased leverage of links 40 when in their orientation that corresponds to the lower most position of lift assembly 18*a*. Thus, the shape of the path P2 is such that the greatest leverage occurs where the greatest force is normally needed to lift the leg assembly, which as noted is typically when leg assembly 21 in its lowest height where the pivot connections 26, 28 of the first and second legs 20, 22 are furthest apart. But here due to the increased leverage by links 40 on crank arms 32, as noted, the force require is not the maximum force. Instead, the maximum force is required when leg assembly 21 is raised about halfway where the pivot connections 26, 28 of the first and second legs are still significantly separated but links 40 have a reduced leverage on crank arms 32.

Figure 8A:
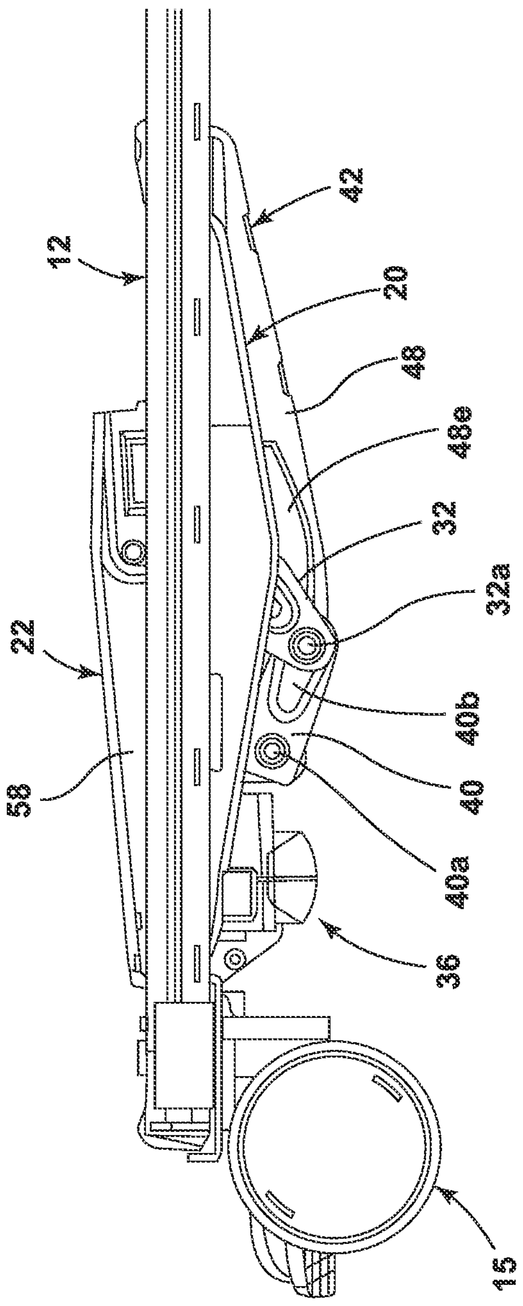
FIG. 8A is an enlarged view of the foot end leg assembly of the lift assembly of FIG. 8.

Stated another way, when leg assembly 21 is fully lowered (see FIGS. 9G and 8A), and pivot connections 40*a* are at the proximal end of path P2, links 40 are substantially perpendicular to crank arms 32 and, therefore, as noted have the greatest leverage. In addition, as noted, due to the increased leverage, the amount of force is less than the maximum force needed during raising or lowering leg assembly 21. As rod 36 is extended, however, the force needed by the actuator increases as the leg assembly is moved from its lower most position to its medial position where pivot connection 40*a* reaches its furthest distance from path P1 (or axis 36*b*), which corresponds to where link 40 forms an acute angle and therefore is angled closer to crank arm 32. In this orientation, link 40 has less leverage than when in the lower most position. As the rod continues to extend, however, the pivot connections 26, 28 of the first and second legs are moved closer together to reduce the amount of torque needed for continued unfolding of the first and second legs 20, 22 so that the reduced leverage of link 40 as it approaches the distal end of path P2 coincides with a reduce amount of torque needed to move second leg 22 closer to the fully raised height of leg assembly 21. As a result, and referring to FIG. 9H, the force margins of the actuator are reduced.

Although described as sliding pivot connections, pivot connections 40*a* may be formed from a single pin or rod 40*a*' that extends between links 40 and plates 48.

Optionally, to provide additional support to tracks 42, crank arms 32 may be pivotally coupled to tracks 42 by a pin or rod 58*a* that passes through apertured flanges 48*g* (FIG. 9B and 12A) extending upwardly from plates 48.

In the illustrated embodiment, in order to increase the rigidity and torsional resistance of lifting legs 20, 22, each frame member that forms the respective lifting leg may be formed from one or more closed cross-section members, such as formed from a metal, such as steel. Alternately, each lifting leg 20, 22 may be formed from a solid member, such as steel bar or plate. Similarly, transverse frame members 50 and 56 may also be formed from tubular members and extended into one or more transverse openings formed in the respective legs 20, 22 and welded thereto around one or both openings to thereby form a rigid frame.

For example, depending members 46 and 58 may be formed from closed tubular members or solid plates. The closed tubular members may be formed from structural channel members or two stamped plates that are joined together, such as by welding. For example, each plate may be stamped into a channel shaped cross-section, which are then joined together in a facing relationship (open sides facing each other, like a clam shell arrangement). Optionally, the two plates may be slightly nested to allow the flanges of one channel shaped member to be inserted into the open face of the other channel-shaped plate and then welded in place with spot welds or continuous welds along their length. Alternately, the plates may be sized so their flanges abut each other and are also welded together, for example, by spot welding or continuous welds along their lengths.

In addition to increasing the strength and torsional resistance of the lifting legs, their construction allows the shape of the legs to be tailored. For example, rather than having to have longer pins 26*b* on pivot connections 26 to span the space between leg 20 and base (12), as seen in FIG. 9A, the lower portions of leg 20 (e.g. depending members 46) may be formed so that they are offset or angled outwardly. For example, starting below pivot connections 30, the lower portions of leg 20 (e.g. depending members 46) may be formed so that they are offset or angled outwardly so that the mounts 26*a* for pivot connections 26 on leg 20 are offset outwardly and can be aligned in the same plane as the mounts 28*a* for pivot connections 28. In this manner, pivot connections 26 and 28 may be mounted in the same channel (channel 12*c* of frame members 12*a*). Consequently, a single tube weldment may be used to form base 12.

Transverse member 44, on the other hand, may be formed from an open sectioned member, such as a channel shaped member, including a channel formed from a stamped plate or a structural channel member.

Track 42, as noted, may be formed from plates, which may be reinforced with braces 48*h* (FIG. 9A). Similarly, links 38, 40 and crank arms 32 may also be formed from plates and when needed provided with embossments or bosses around their mounting openings to increase their strength. For example referring to FIG. 12E, each link 40 may be formed from an elongated rectangular plate with an embossment 40*b* to reinforce the plate. Similar, crank arms 32 (FIG. 12C) may be formed from a generally triangular shaped pate and include embossments 32*b*, which reinforce the crank arms.

Figure 12B:
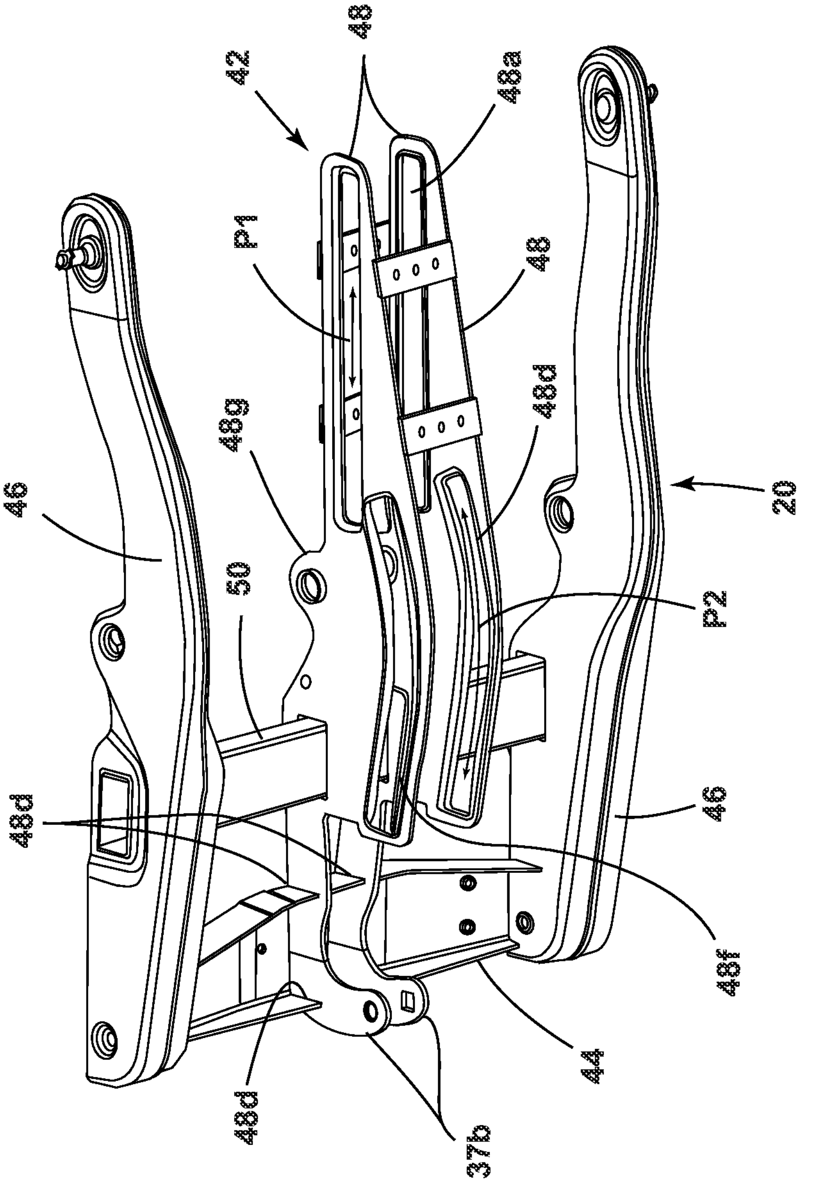
FIG. 12B is a second enlarged perspective view of the lifting leg of FIG. 12A.
Figure 12C:
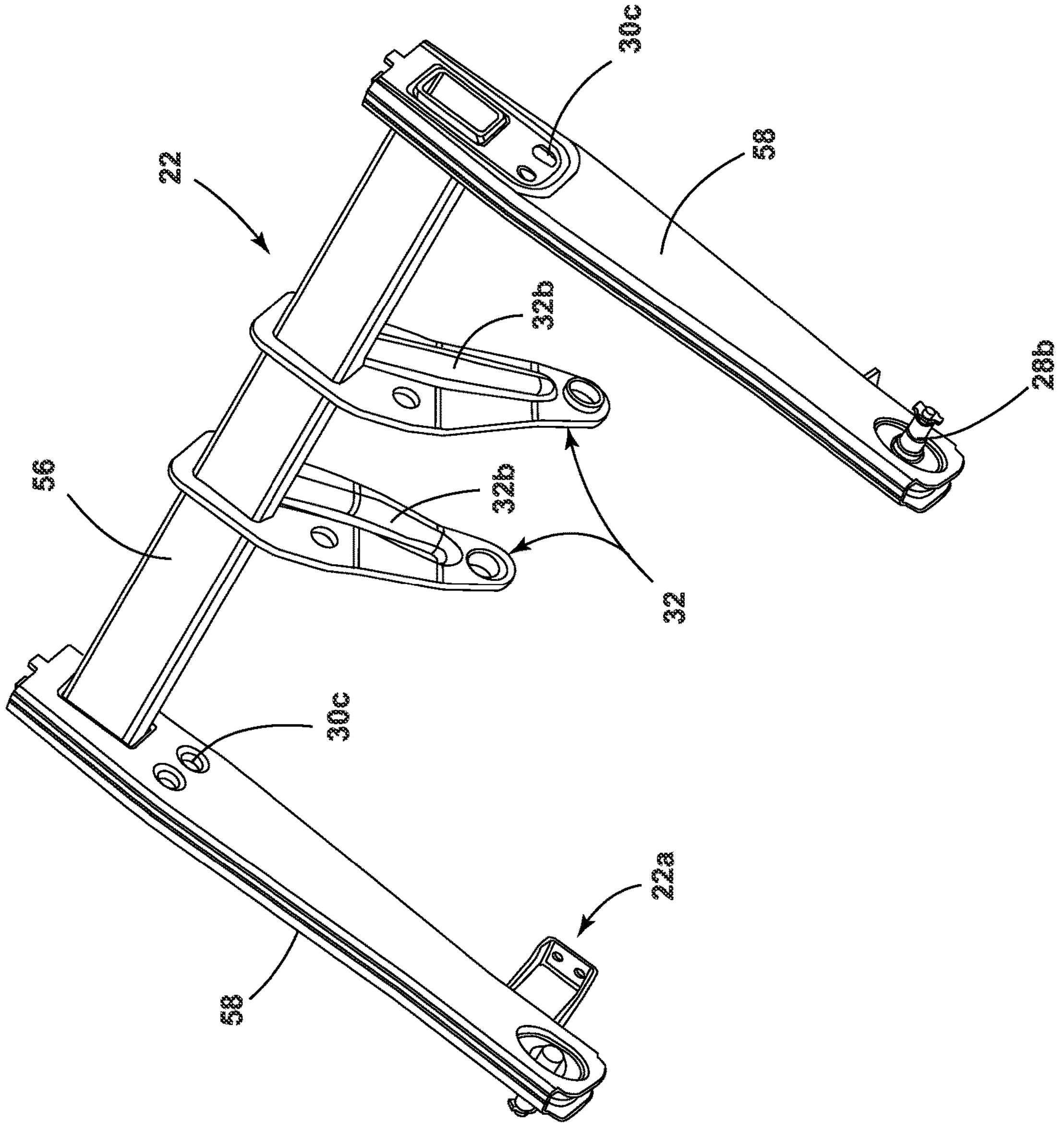
FIG. 12C is a perspective view of the other lifting leg of the lift assembly.
Figure 12D:
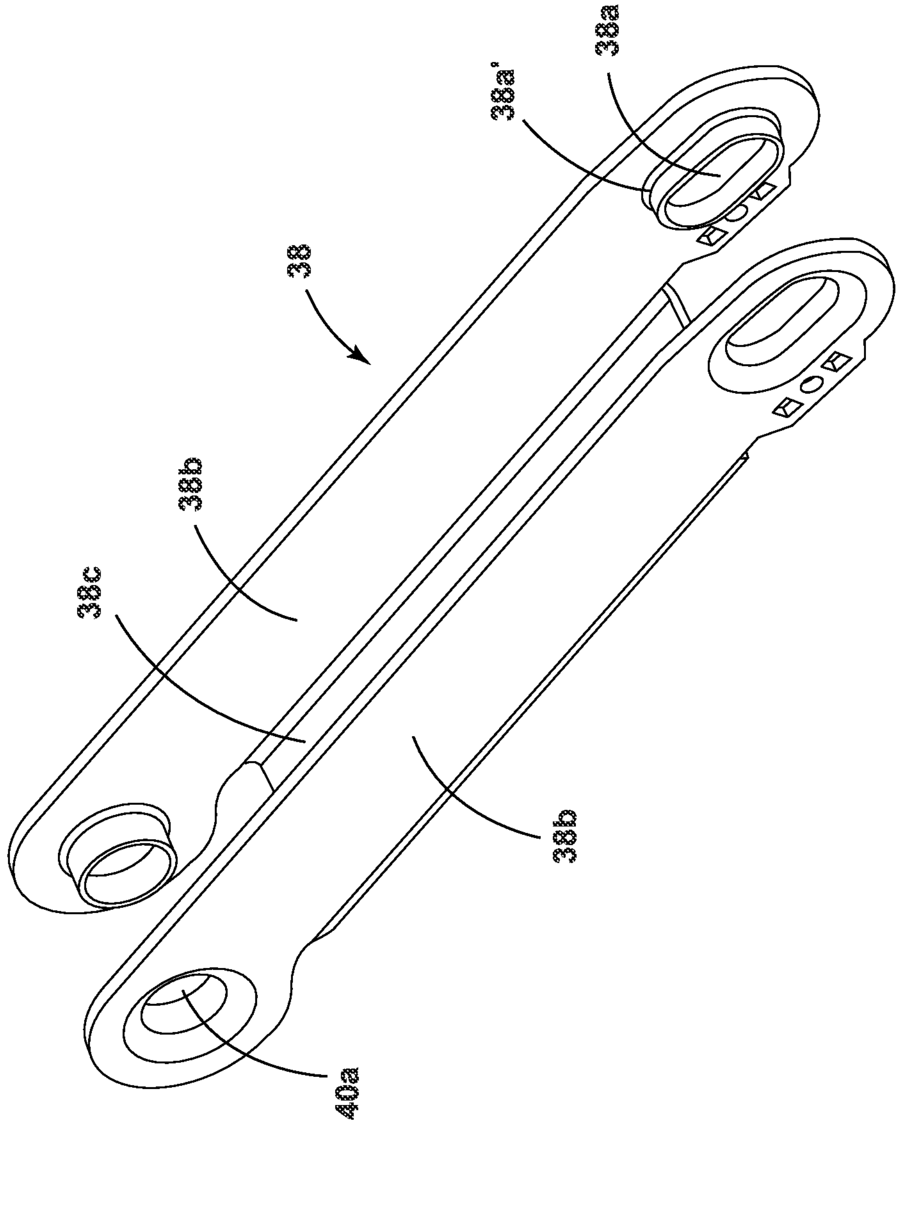
FIG. 12D is an enlarged perspective view of one of the links of the lift assembly.
Figure 12E:
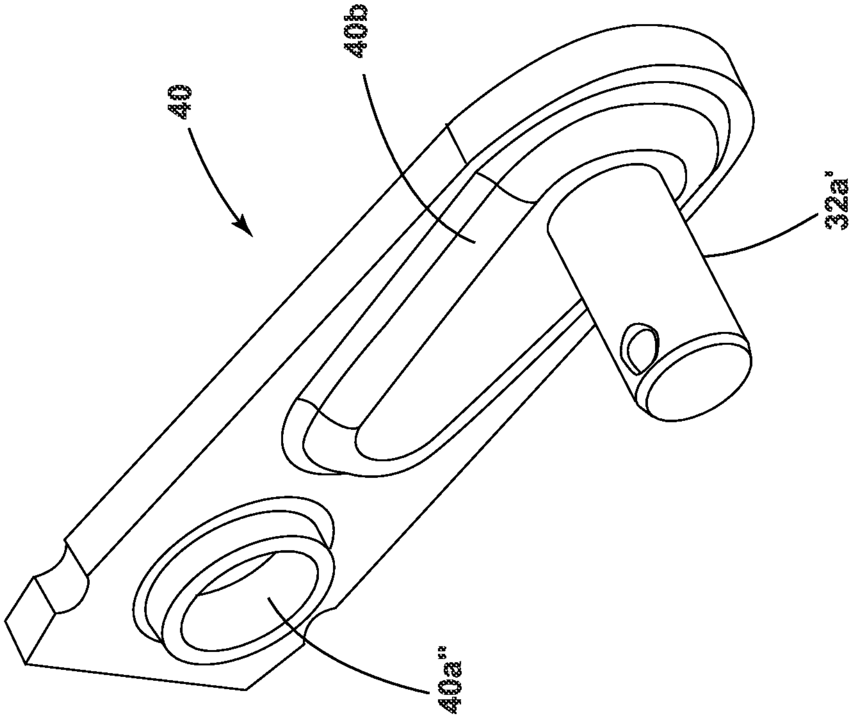
FIG. 12E is an enlarged perspective view of another link of the lift assembly.

Referring to FIG. 12B, links 38 may be formed from two plates 38*b* joined at their (e.g. lower) edges by a transverse plate 38*c*, which may be welded to or formed with plates 38*b* to form an U-shaped link assembly. Openings 38*a* to may be reinforced by bosses or lips 38*a*' that encircle openings 38*a* and which also form bearing surfaces for pin 36*c* of actuator 36. As noted above, openings 38*a* may also be elongated to allow off-loading from the actuator 36, for example, when lift assembly 18*a* is fully lowered.

Further, as shown in the illustrated embodiment, the cross-section for the components of the lift assembly may vary along their length to provide increased strength where needed, but reduced in cross-section where the loads on the lift assembly are reduced to thereby provide a more compact and reduced weight light assembly. Further, by varying the cross-sections, the components of the lift assembly may provide a better nesting arrangement when folded. In the illustrated embodiment, frame members 46 are formed with three different cross-sections at three different elevations, which allow the lifting leg 20 to avoid interference with other components of the bed, including leg 22, as it swings though its full range of motion.

For example, referring to FIG. 9A, the upper end of leg 20, for example, depending frame members 46 may have the largest cross-section given that the forces to raise or lower the frame 14 are greatest at the upper end of leg 20. Further, with the increased cross-section, a portion of the frame members 46 may have an open section at their upper ends to provide for cable routing through lift assembly and, further, to provide better nesting. As best understood from FIG. 1A, when lift assembly is fully folded and frame 14 is lowered, the mounting brackets 14*c* and mounting blocks 14*d* may extend into and nest in the open sections of the upper portion of frame members 46, which again assists in reducing the overall height of the deck when the lift assembly is in its lower most configuration.

As noted above, the lower ends of lifting legs 20, 22 are mounted to base 12 by pivot connections 26, 28. As seen in FIG. 9, pivot connections 26 may be formed by a sliding block 60 rotationally mounted to each of the lower ends of the lifting legs 20 by pins 26*b*. Blocks 60 are guided in channels 12*c* formed in base frame members 12*a* (FIGS. 2 and 4) between upper and lower flanges 12*b*. Similarly pivot connections 28 may be formed by blocks 64 rotationally mounted to each of the lower ends of the lifting legs 20 by pins 28*b*. Blocks 64 are located and fixed in channels 12*c* by fasteners 65, which extend through openings in upper flange 12*c* of frame members 12*a*.

To make the lift assembly more compact, blocks 60 and 64 may be mounted to pins 26*b*, 28*b* without the use fasteners or spring clips and, instead, retained on pins 26*b* and 28*b* using a tab and slot arrangement with blocks 60 and 64, respectively, described below in reference to FIGS. 10, 10A, 10B, and 10C. Further, in order to avoid blocks 60, 64 being rotated off pins 26*b,* 28*b,* each block has a tabbed connection for mounting the pins 26*b*, 28*b* to the block. Each pin 26*b,* 28*b* has one or more tabs that have to align with corresponding notches provided in the block mounting opening 60*b,* 64*b* in order to mount the blocks or remove the blocks from the pins. Additionally, referring to FIGS. 3 and 10, each of the mounting blocks are square or rectangular in shape so that they can be retained between the upper and lower flanges 12*b* of frame members 12*a* and do not rotate, though pins 26*b* and 28*b* are free to rotate in the blocks. The tabs on the pins (and corresponding notches) are arranged so that they do not align during normal movement of the lift mechanism and, therefore, retain the respective blocks on the pins (26*b* 28*b*) during normal operation.

Figure 10:
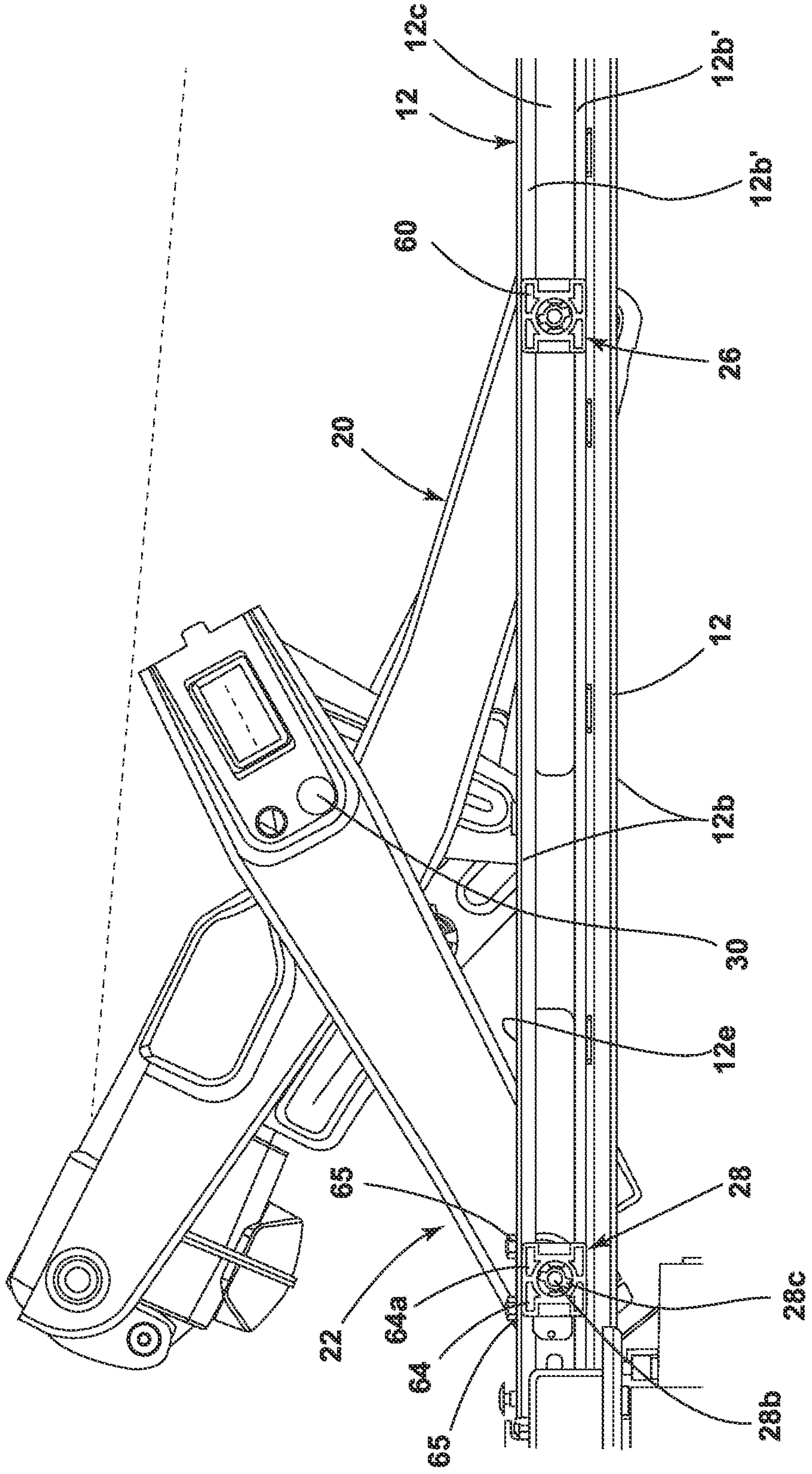
FIG. 10 is an enlarged fragmentary outside elevation view of the mounting arrangement of one of the leg assemblies of the lift assembly to the base of the patient support apparatus.
Figure 10A:
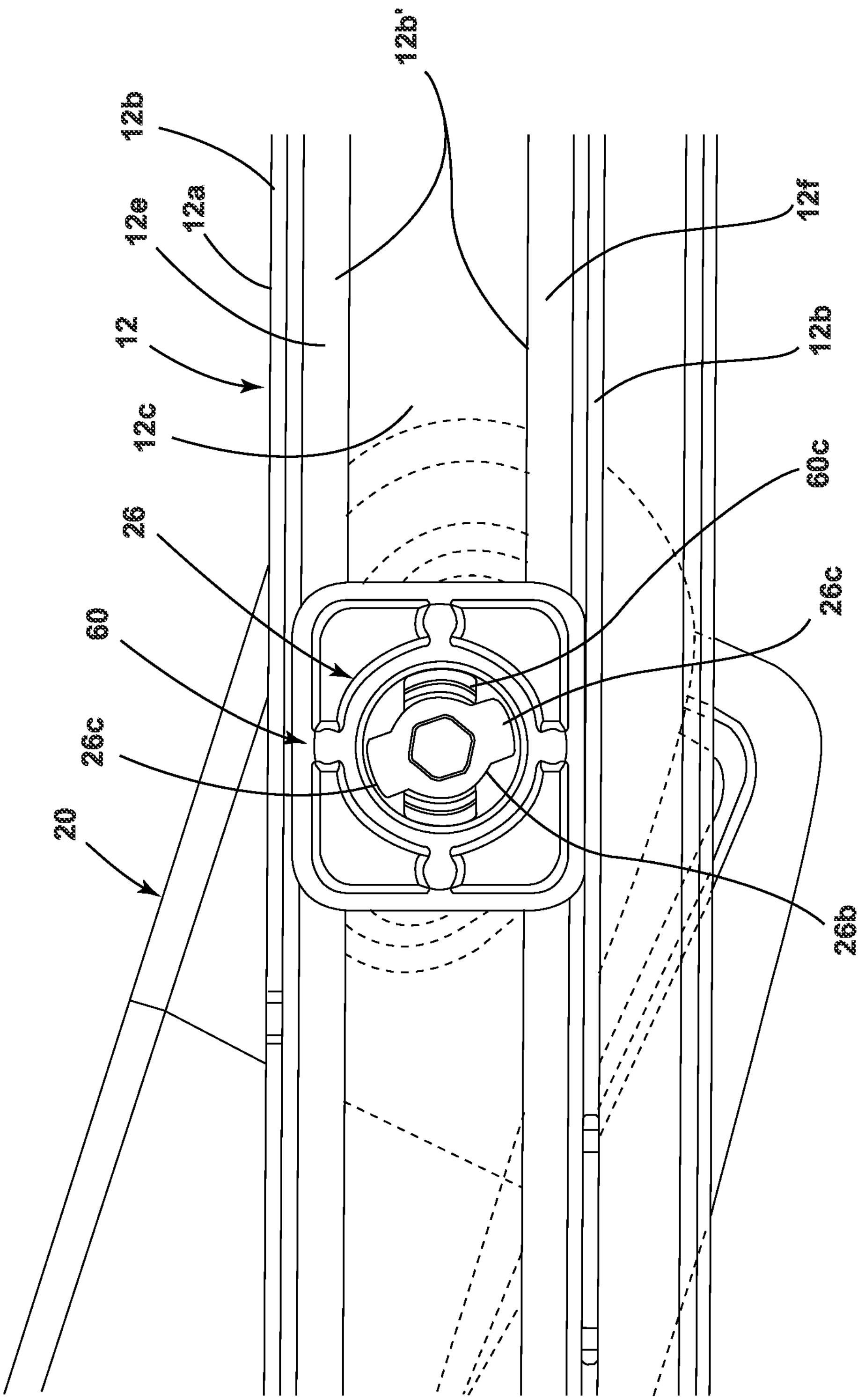
FIG. 10A is an enlarged cut-away of the base frame member illustrating a slide block of the lifting assembly.
Figure 10B:
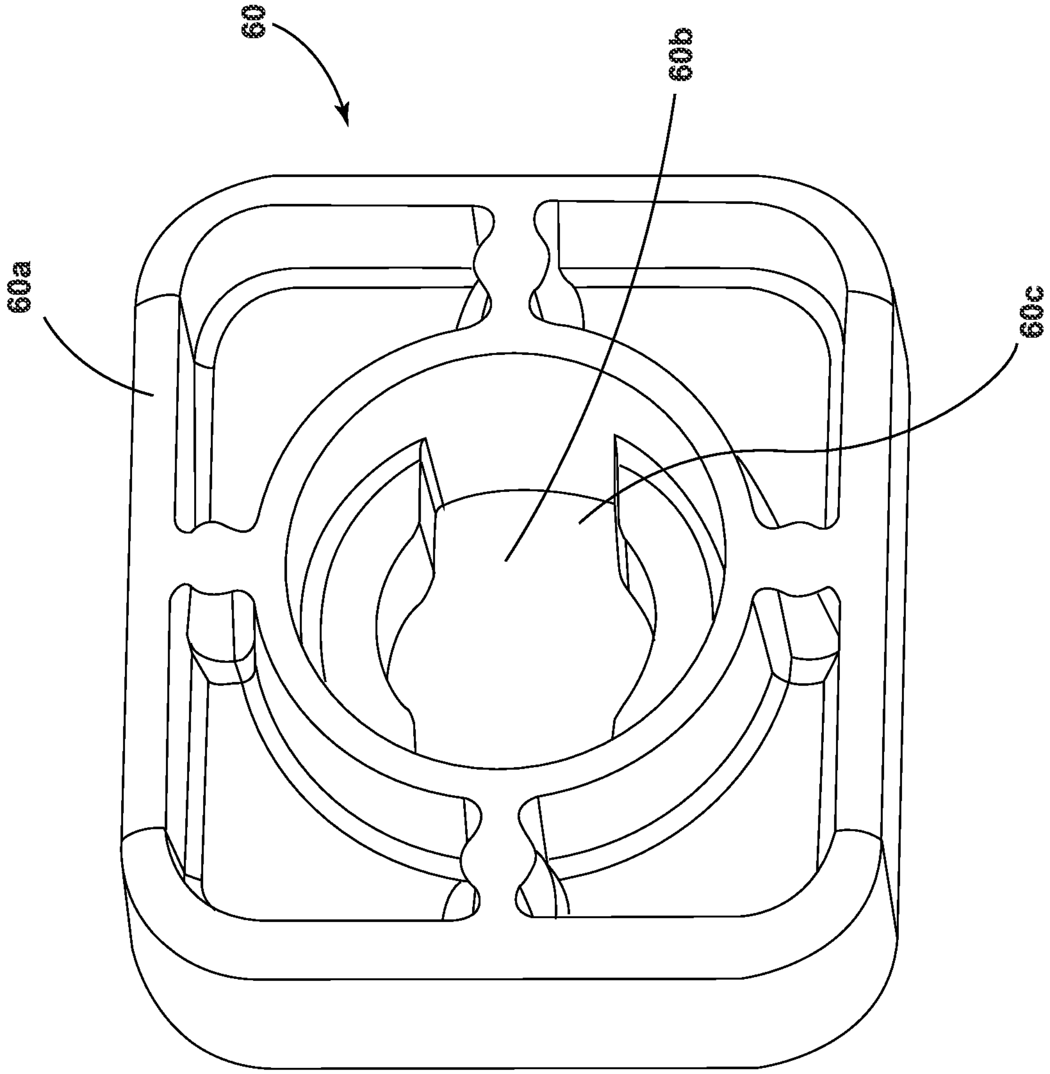
FIG. 10B is an enlarged perspective view of the slide block of FIG. 10A.

As best seen in FIGS. 10A and 10B, blocks 60 have rectangular body 60*a* with a central transverse opening 60*b,* which includes one or more notches 60*c*. In the illustrated embodiment, opening 60*b* includes a pair of opposed notches. Similarly, pin 26*b* has one or more tabs 26*c* for aligning with the notch or notches. When so aligned, pins 26*b* may be inserted into the opening 60*b* in the block 60 and, thereafter, the block 60 rotated about the pin to thereby retain the pin on the block. The block is then inserted into the frame member 12*a* (via cutouts or notches 12*e* described below) and captured between the upper and lower flanges. Optionally, upper and low flanges may include downwardly and upwardly extending lips 12*b*' (FIGS. 10 and 10A), respectively, to further help retain blocks 60 and 64 in channels 12*c*.

Figure 10C:
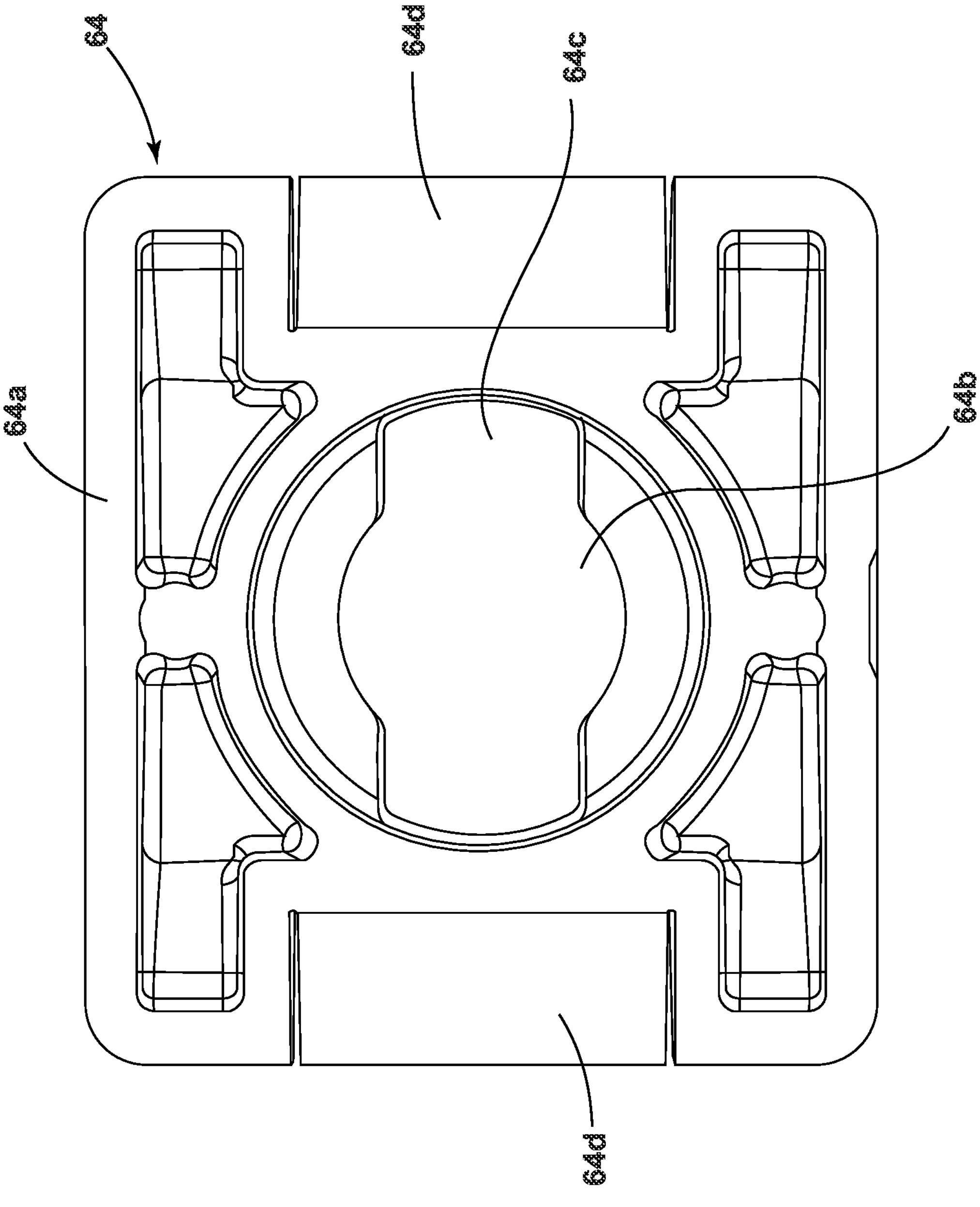
FIG. 10C is an enlarged elevation view of a mounting block.

As best seen in FIG. 10C, blocks 64 similarly have a rectangular body 64*a* with a central transverse opening 64*b,* which includes one or more notches 64*c*. In the illustrated embodiment, opening 64*b* includes a pair of opposed notches 64*c*. Similarly, pin 28*b* has one or more tabs 28*c* for aligning with the notch or notches. When so aligned, pins 28*b* may be inserted into the opening 64*b* in the block 64 and, thereafter, the block 64 rotated about the pin to thereby retain the pin on the block. The block is then inserted into the frame member 12*a* (via cutouts or notches 12*e* described below) and captured between the upper and lower flanges 12*b*. To secure block 64 in a fixed location, block 64 includes transverse openings through body 64*a* and offset portions 64*d* that are curved and align with the transverse openings for receiving fasteners 65 through body 64*a* and thereby fix the location of the pivot connection 28 along frame members 12*a* of base 12.

Figure 3:
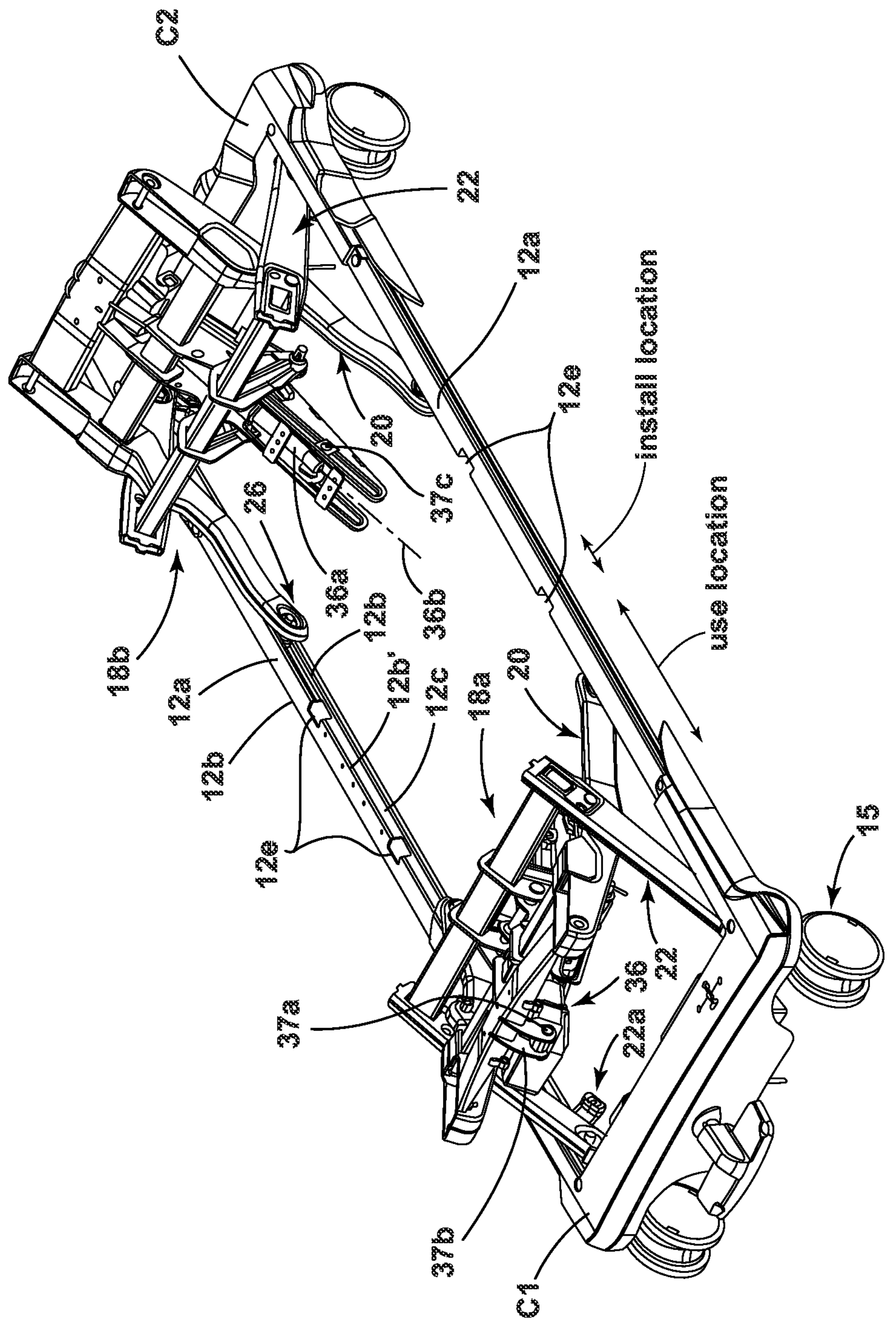
FIG. 3 is another perspective view of the patient support apparatus similar to FIG. 2 illustrating the lift assembly in a mid-height position.
Figure 3A:
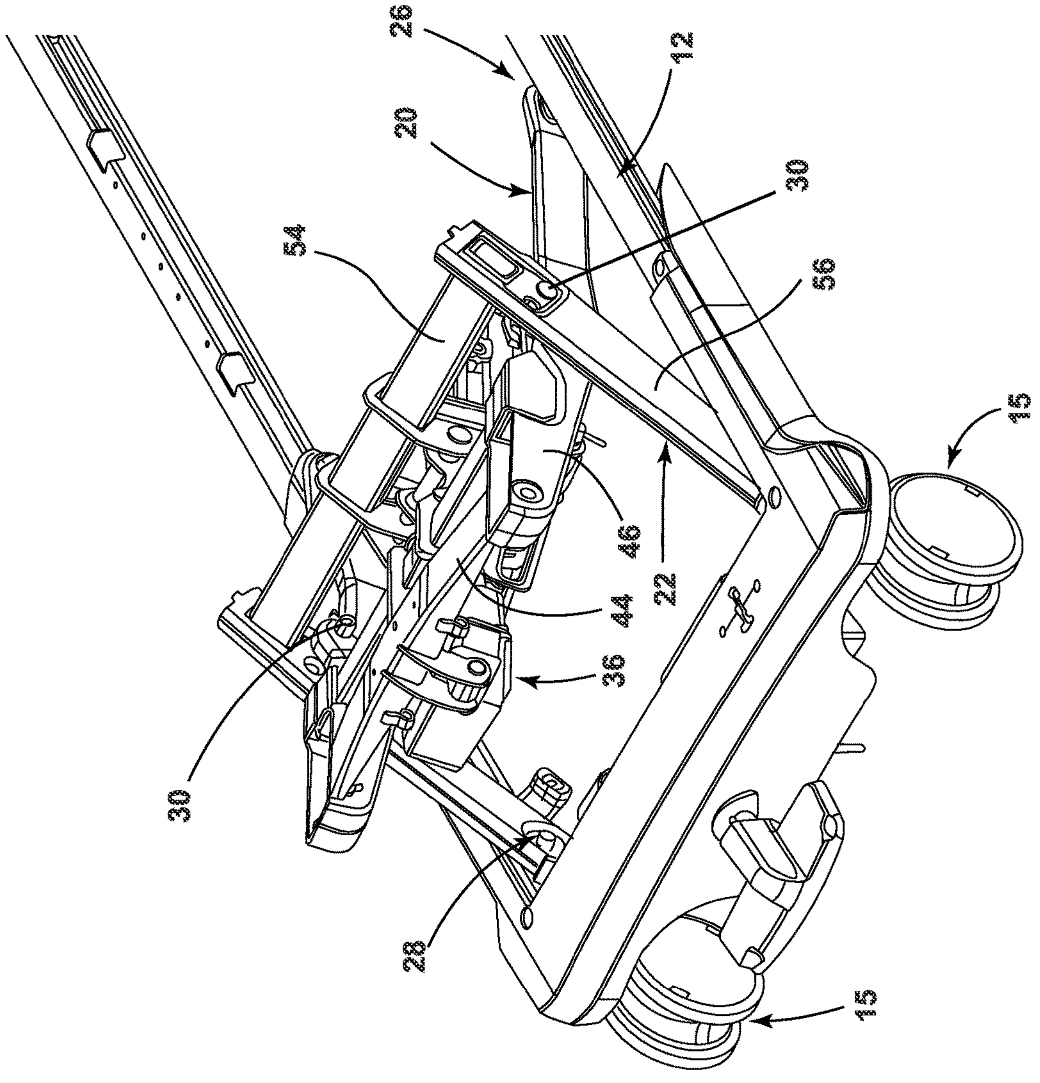
FIG. 3A is an enlarged view of the foot end leg assembly of the lift assembly of FIG. 3.

Referring to FIGS. 3 and 10, blocks 60 and 64 are inserted in channels 12*c* of frame members 12 via notches 12*e* formed in the upper flanges 12*b* of frame members 12. Notches 12*e* are located offset from pivot connections 28, which when installed are fixed along the longitudinal axis of frame members 12*a* via fasteners 65, and out of the normal travel of the sliding pivot connections 26. Once inserted therein, blocks 60, 64 are moved to their in use locations and then retained therein by the upper and lower flanges 12*b* and optional lips 12*b*' of frame members 12*a*. Thus, base 12 has install locations for the pivot connections offset from their use locations.

In addition to the overall construction, this installation arrangement and mounting configuration allows for lift assembly 18*a* (and 18*b*) to be installed as a unit (with the actuator and lines (e.g. power and/or hydraulic lines and/or pneumatic lines) already assembled in the unit), simply requiring the lift assembly to be inserted into the base and connected at their upper ends to mounting blocks 14*d* without the need for additional brackets and fasteners for installation.

Figure 1C:
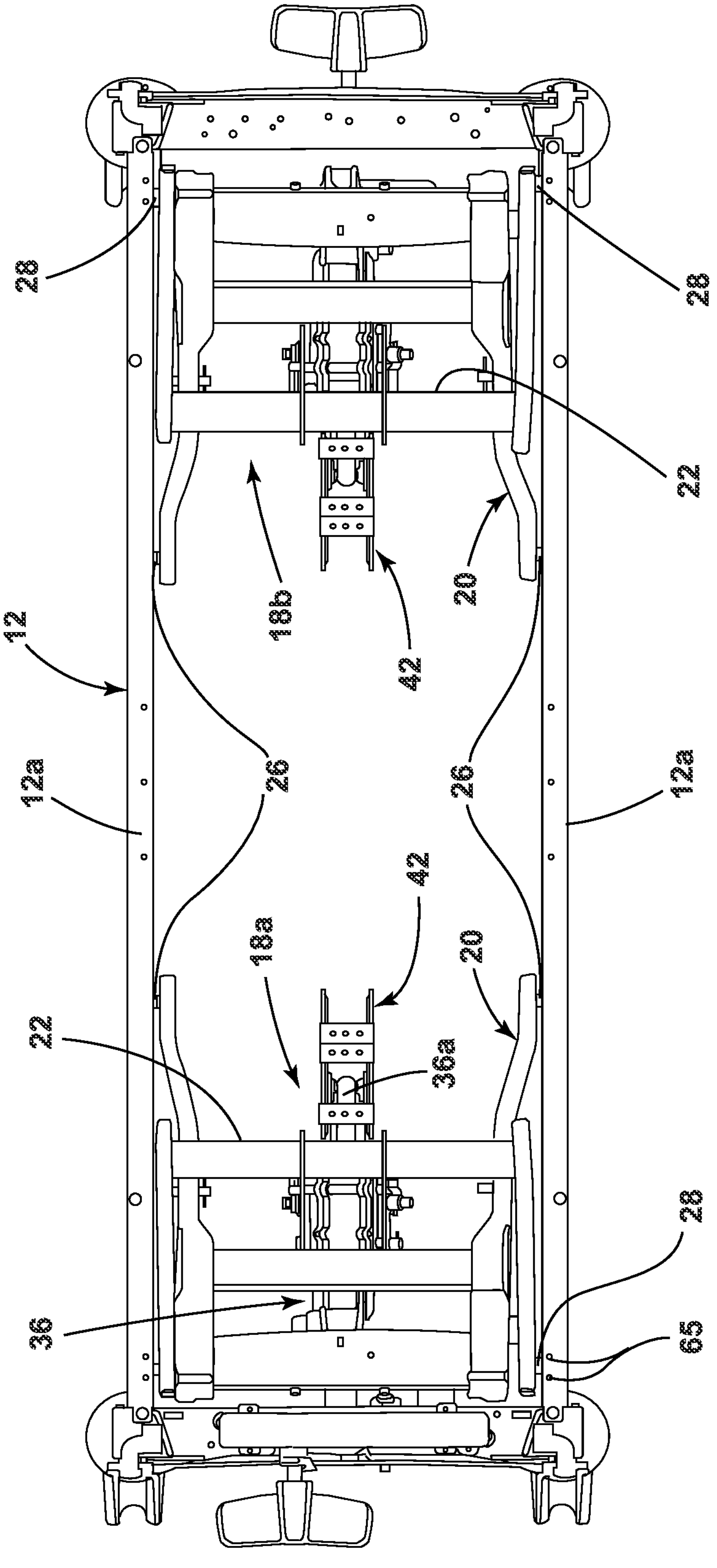
FIG. 1C is a plan view of the patient support apparatus of FIG. 1 with the deck, headboard, and footboard removed to show the mounting arrangement of the lift assembly in its fully lowered position.

Further, referring again to FIGS. 1C and 4, when frame 14 is in its lowermost position, frame members 14*a* of frame 14 may rest on base 12, namely on between base members 12*a*. Additionally, lifting legs 20, 22 and crank arms 32 are arranged so that they fold into the space defined between base members 12*a,* with the majority, if not all of, legs 20 and actuator 36 lying at or below the upper flange of base members 12*a* (FIG. 8). Further, as noted, pivot connections 26 and 28 are aligned along the respective base frame members 12*a* and lie in the same plane, with pivot connections 30 aligned at or just below the upper flange of the respective frame members 12*a*.

In this manner, when lift assembly 18 is in its lowermost configuration, many of the components of the lift assembly (lifting legs, crank arms) are lowered into the space defined between or slightly below base frame members 12*a,* but leave there between space S, as described above. Additionally, when lift assembly 18 is in its lowermost configuration, the distance from the top of the deck to the floor may be less than 14", less than 13", and optionally less than 12". Further, the space below base members 12*a* is sufficient to allow a base of an overbed table or lift assembly to extend under base. For example, the distance from the underside of the base members 12*a* to the floor is at least 4", at least 5" or between about 5"-6".

As noted about, second lifting legs 22 have one or more stops 22*a* to provide a stop for the upper portion of leg 20 when leg assembly 21 is fully folded. Stops 22*a* are mounted and arranged to extend inwardly of legs 22 so that they provide bearing surfaces for depending frame members 46 of first lifting leg 20 when it is fully folded.

Figure 11:
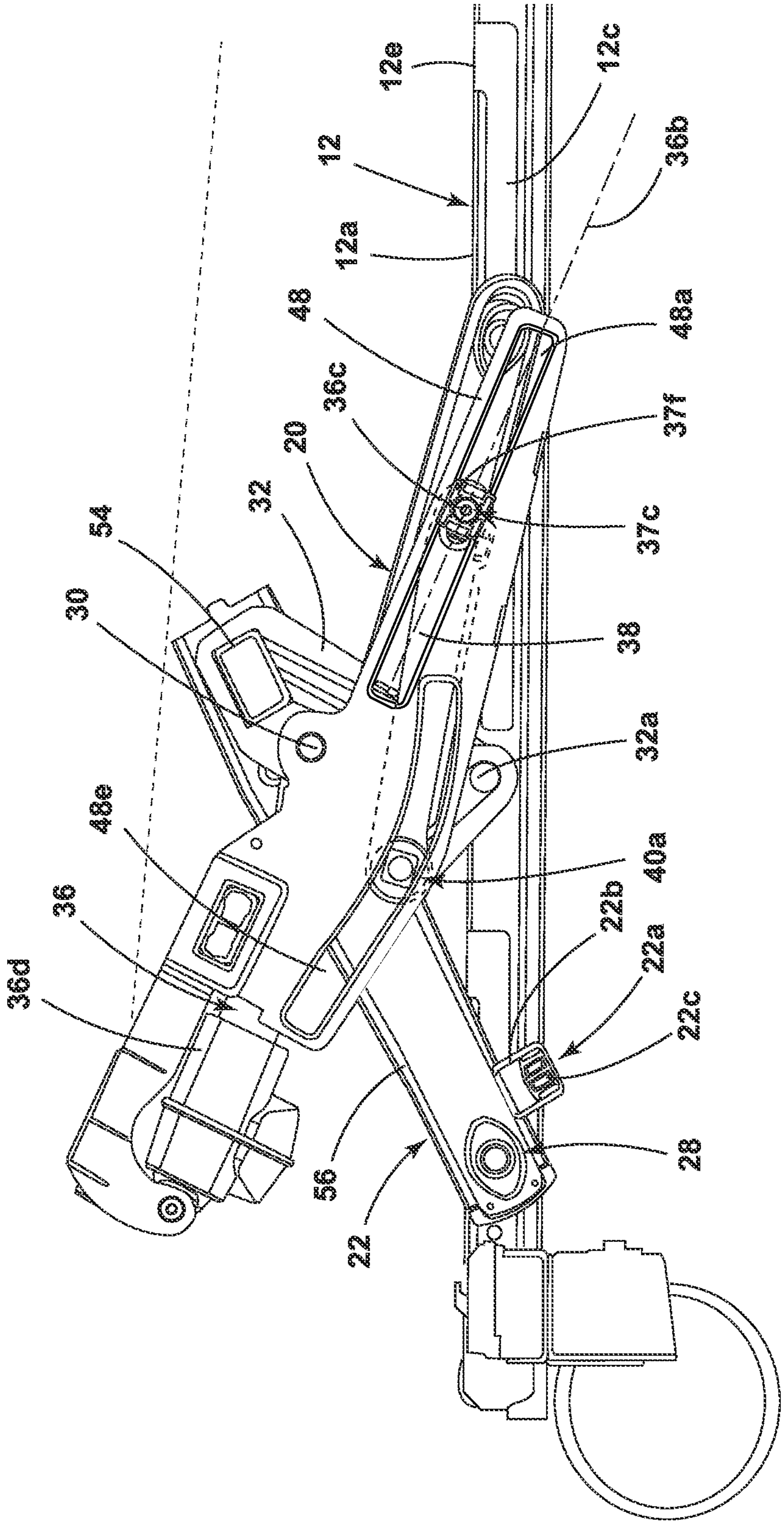
FIG. 11 is an enlarged fragmentary inside elevation view of the mounting arrangement of one of the leg assemblies to the base of the patient support apparatus.

In the illustrated embodiment, stops 22*a* are formed by L-shaped brackets 22*b* mounted, such as by welding, to the inner side 22*c* of lifting legs 22. Brackets 22*b* extend inwardly from inwardly facing side 22*d* of leg 22 to contact downwardly facing side of leg 20 when leg 20 is folded. Brackets 22*b* may have a rubber bumper or rubber bumpers 22*c* (FIG. 11) mounted thereto to reduce noise and absorb some vibration. Because the stop is located adjacent pivot connection 28, when folded, the weight of the deck and frame pass essentially directly through legs 22 to base 12.

Referring to FIG. 9A, as described above, actuator 36 may be mounted to reduce side loading on the lift assembly components. For example, pin 36*c* of actuator 36 may be mounted in slot 48*a* of plate 48 between links 38 and between a pair of bushings 37*e* (FIG. 9D). Optionally, gaps or spaces are provided between bushings 37*e,* for example plastic bushings, and rod 36*a* (or between the bushings and links 48) to provide sufficient play to avoid binding but also play that is sufficiently small to avoid inducing side loading (e.g. to avoid actuator from angling relative to path P1) on lift assembly, and more specifically on track 42. For example, the gaps on each side may fall in a range of ½ to 1/1000$^{th}$ inch. Further, to help retaining pin in slots 48*a,* each opposed end of the pin 36*c* may be guided by a rectangular bushing 37*f* that is taller than the height of the slots 48*a* so that they ride on the outside of plates 48. Optionally, springs may be provided in lieu of, or in addition to bushings 37*e,* to help maintain the alignment of the rod 36*a* along path P1.

Referring to FIGS. 1A and 3, optionally one or more of the lift assembly components may include protective and/or aesthetic covers, formed, for example, from plastic. For example, covers C1 and C2 may be provided to cover and optionally protect the head end and foot ends of the base 12. Similarly, at least the rods of the actuators and track may be covered by a cover C3. Covers C4 may also be provided to extend over legs 22. However, it should be understood with the closed construction of many of the lift assembly components, covers need not be provided for the leg assemblies of the lift assembly.

Although not specifically described in each instance, it should be understood that the structural load bearing members of the lift assembly may all be formed from metal, including steel, and further may be stamped, molded, cast or forged members, and assembled by welding. Other members, such as the mounting blocks or covers, may be formed from plastic or other low friction materials, which may be molded.

Optionally, at least some, if not all, of the pivot connections may incorporate a retainer 70 (FIG. 12F) that renders the pivot connection tamper resistant, and optionally non-serviceable. It also makes the lift assembly connections easy to inspect. Although detailed in reference to pivot connection 40*a* of link 40, it should be understood that the same or similar details apply to the other pivot connections.

Figure 12F:
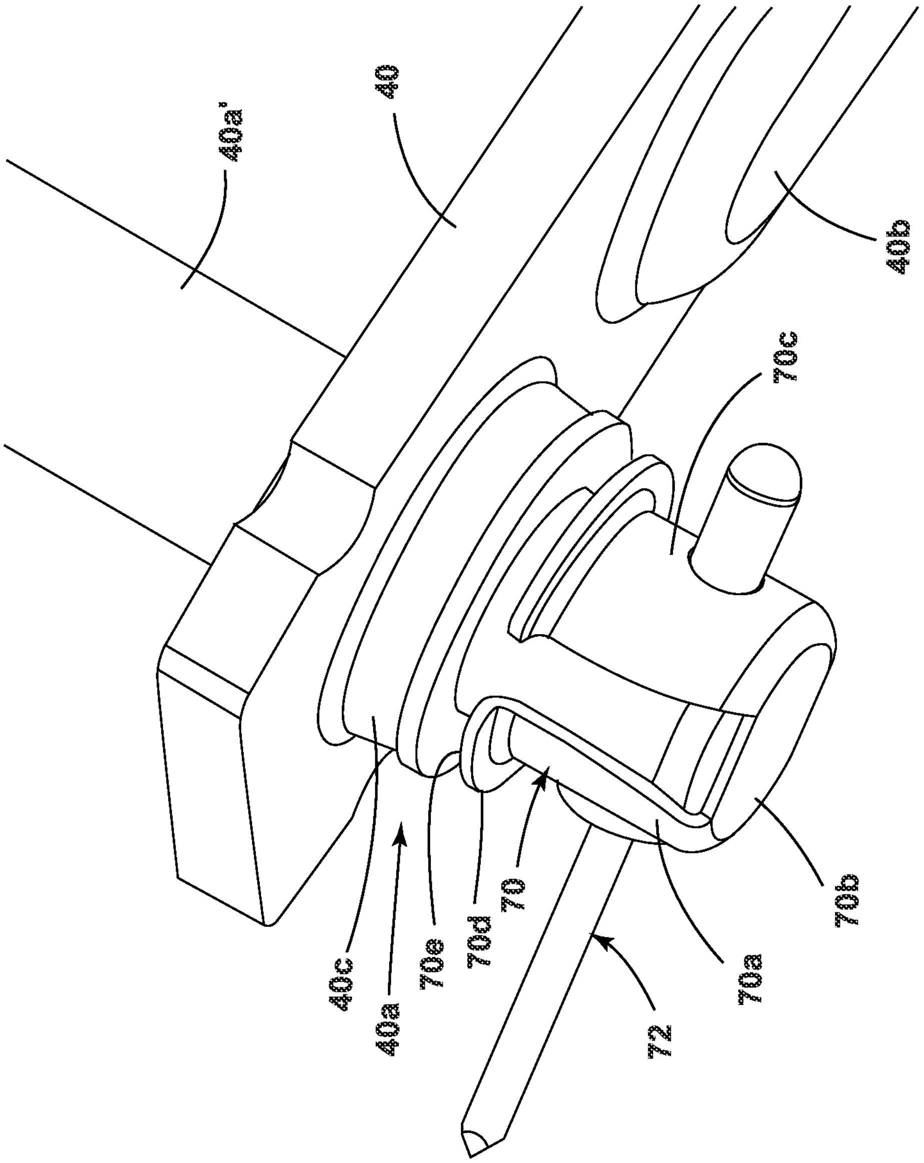
FIG. 12F is an enlarged perspective view of an exemplary pivot connection of the lift assembly.

As best seen in FIG. 12F, the end of the pin 40*a*' of the pivot connection (40*a*) projects though the opening provided in link 40. Optionally, the opening may be reinforced by a raised boss 40*c*. Mounted on pin 40*a*' about opening is retainer 70. Retainer 70 is mounted to the distal end of pin 40*a*' via a standard pop rivet 72, which extends though retainer 70 and though a transverse opening provided in the distal end of pin 40*a'*.

In the illustrated embodiment, retainer 70 includes a cylindrical body 70*a* with a closed end 70*b,* which rests against the distal end of pin 40*a*'. The cylindrical wall 70*c* of body 70*a* is bifurcated to ease installation on the end of pin 40*a*' so that it can be manually mounted on the distal end of pin 40*a*', though a tool can be used as well. Optionally, body 70*a* includes a flanged end 70*d* that forms an annular bearing surface 70*e,* which can provide some thrust load when for example, when pin 40*a*' pulls inwardly as view in FIG. 12F and engages washer W. Thus, retainer 70 provides an easy to inspect connection, which is tamper resistant and, further, may be non-serviceable, to ensure the correct assembly at the original manufacturing facility.

Figure 5:
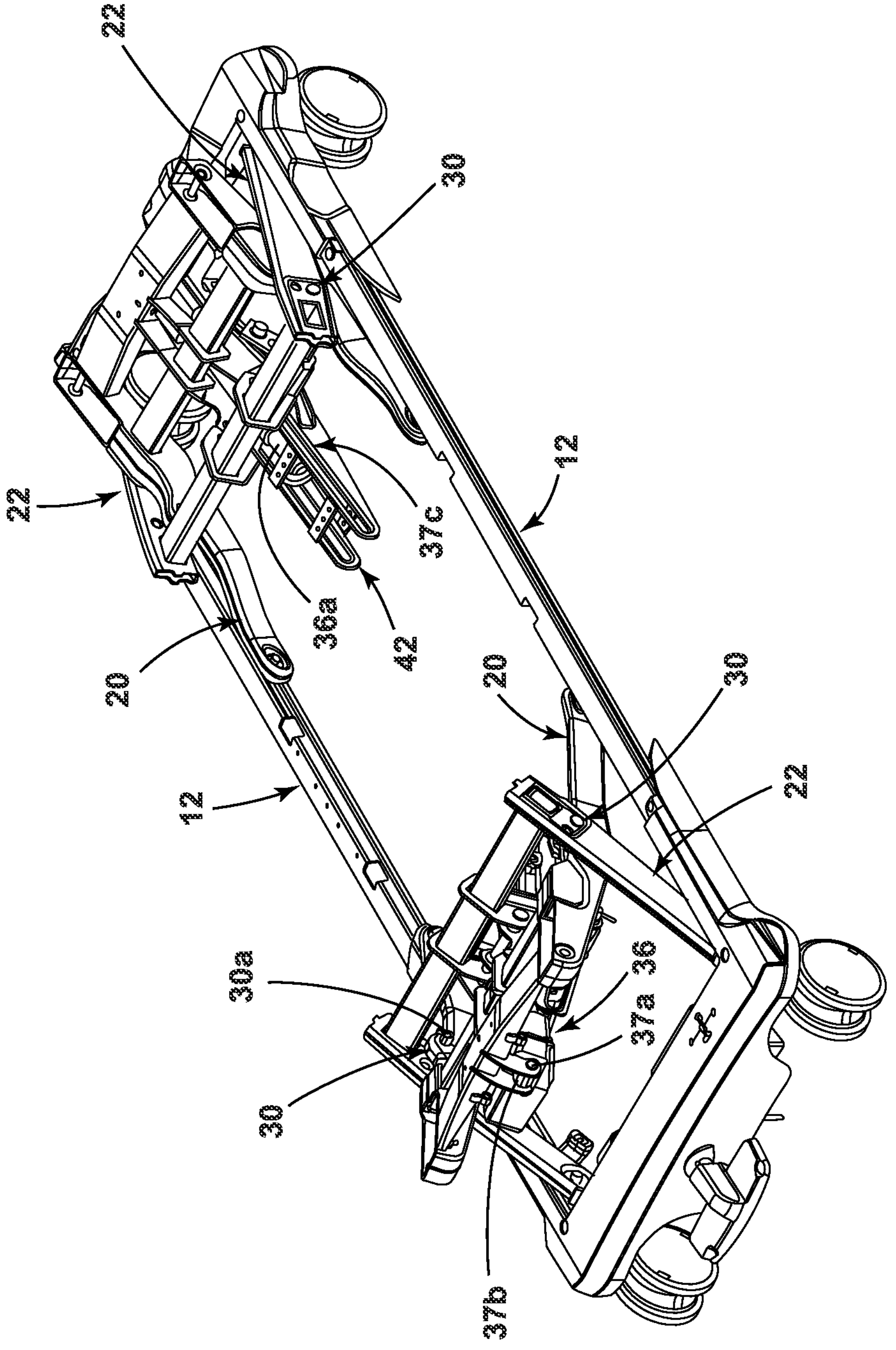
FIG. 5 is another perspective view of the patient support apparatus similar to FIG. 2 illustrating the lift assembly in a Trendelenburg position.
Figure 6:
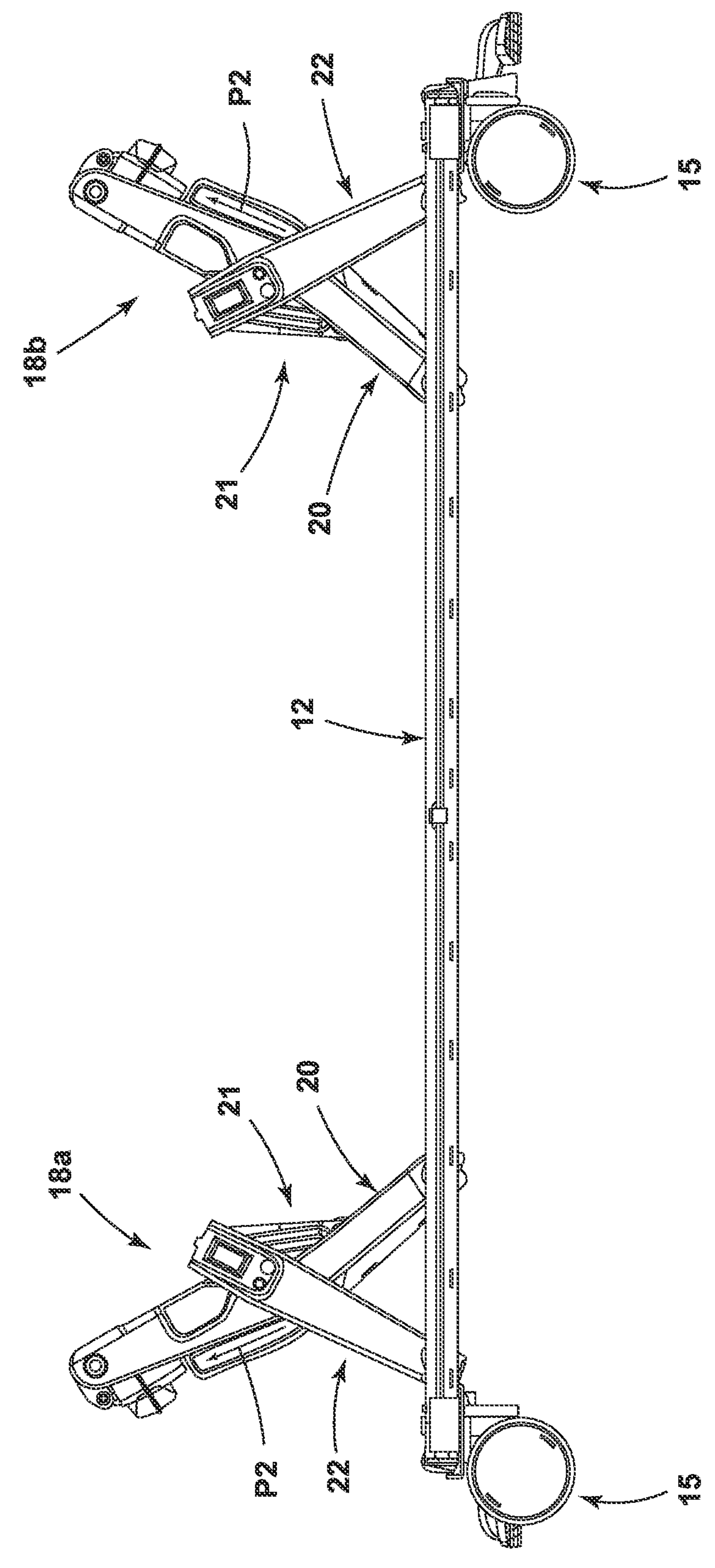
FIG. 6 is a side elevation view of the patient support apparatus with the deck, frame, headboard, and footboard removed to show the lift assembly in its full height configuration.
Figure 6A:
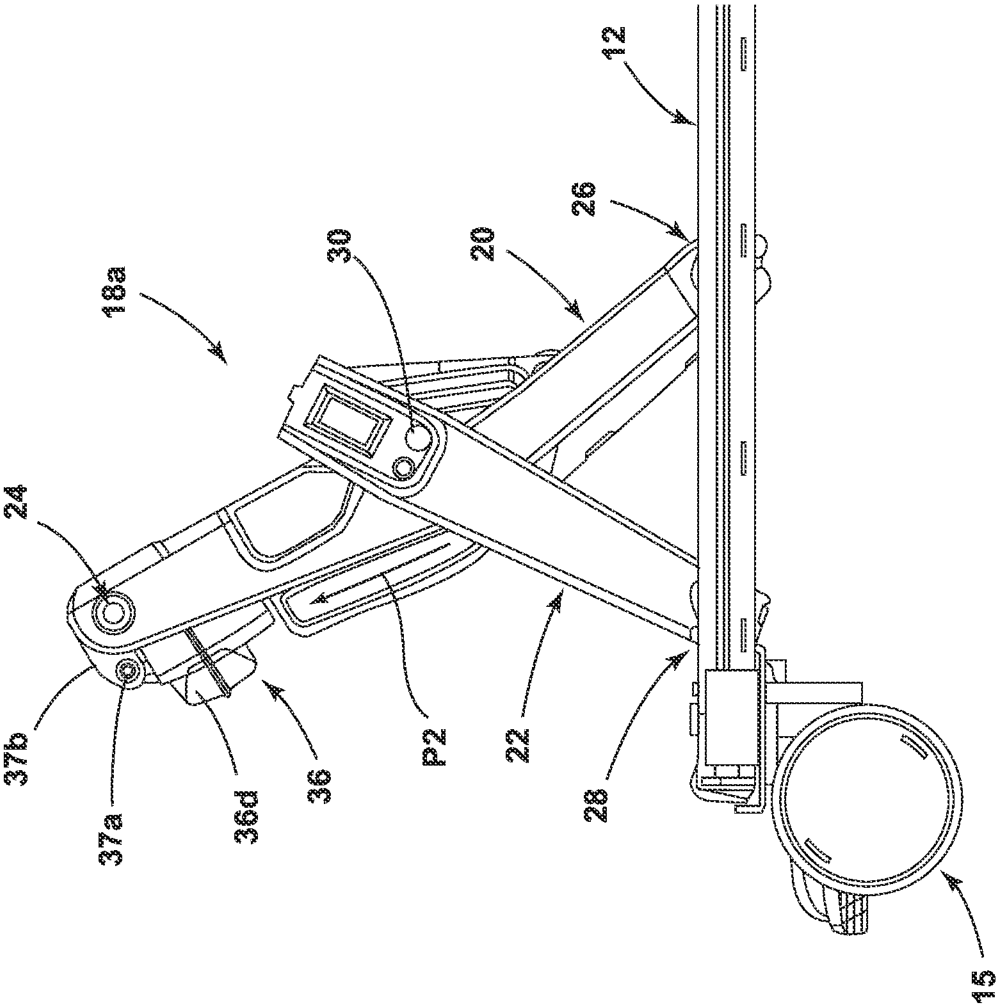
FIG. 6A is an enlarged view of the foot end leg assembly of the lift assembly of FIG. 6.
Figure 7:
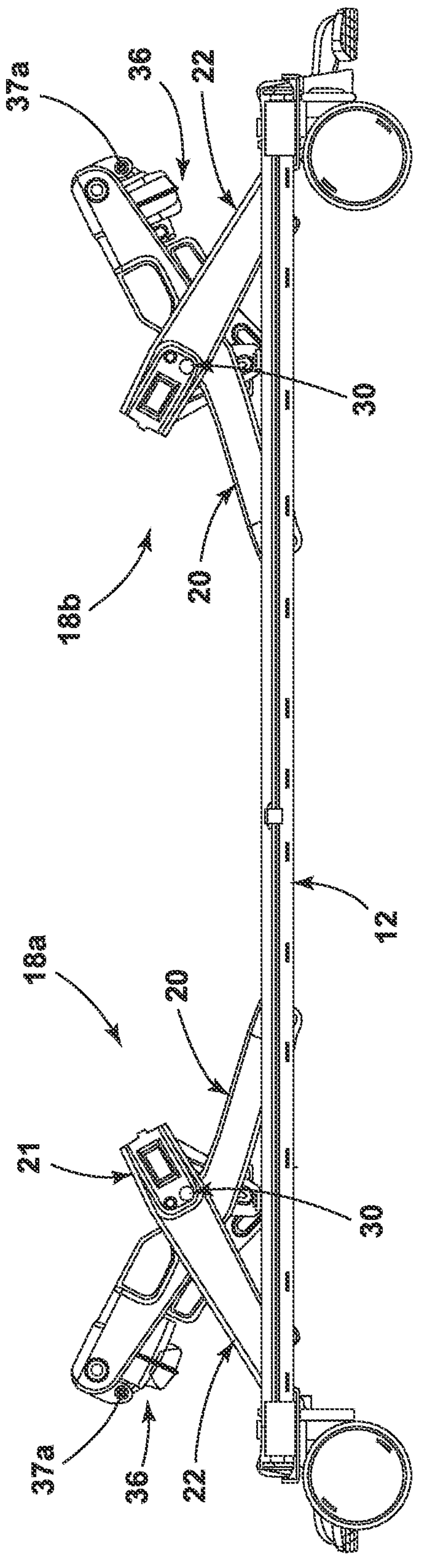
FIG. 7 is a side elevation view similar to FIG. 6 with the lift assembly in its mid-height position.
Figure 7A:
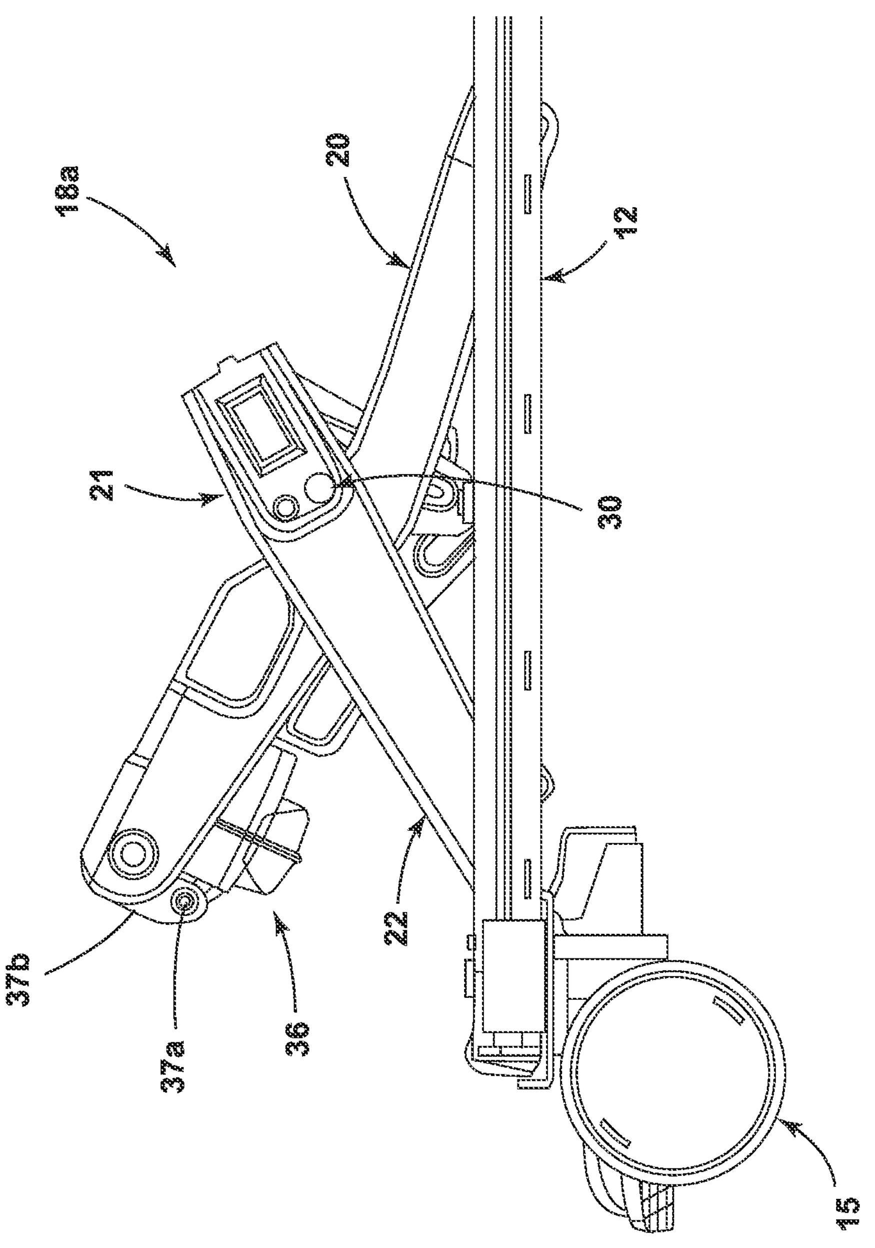
FIG. 7A is an enlarged view of the foot end leg assembly of the lift assembly of FIG. 7.

As would be understood, because the head end and foot end lifting assemblies are independent, they can be independently moved to raise or lower the head or foot ends of the support frame to move the deck in a Trendelenburg or reverse Trendelenburg position (see FIGS. 1A, and 5). Additionally, the speeds of each actuator can be independently controlled. For example, suitable actuators include Linak actuators, such as model number LA 40, or Ilcon actuators. For example, the actuators may include sensors or magnets to measure the speed of the actuator so that, as noted, the actuation and speed of each actuator may be independently controlled.

Referring to FIG. 9H, in one embodiment of a standard hospital bed, the force of the actuators may range from about 5300-5400 N when in the lowermost position, up to about 5700-5800 N when about midway between the lowermost position, and then back down to about 3200-3300 N when in the uppermost position. As would be understood normally the greatest force is needed when the lift assembly is in its most compact, lowermost position; however, with the current arrangement of links and crank arms, which maximizes the moment arm when the leg assembly is in its lowest most position, the initial starting force (SF), as noted above, is less than the maximum force F1. As the lifting legs raise up relative to the base, the leverage provided by the crank arms decreases until the lift assembly has reached the midway region, approximately 19-24 inches off the floor, thus increasing the required force. As the lift assembly continues to rise , the leverage provided by the crank arms furthers reduces but at a reducing rate, as shown in FIG. 9H, until the lift assembly is in its uppermost configuration.

With the above configuration, when lift assembly 18 is in its lowermost position, the distance from the top of the litter deck (shown in phantom in FIG. 30) to the floor may be less than 14", less than 13", and optionally less than 12", and the space beneath base frame members 12*a* is unobstructed to allow a base of an overbed table or lift assembly to extend under base. For example, the distance from the underside of the base frame members 12*a* to the floor is at least 4", at least 5" or between about 5"-6" and provides a minimum clearance of about 2 to 3 inches or about 2.4 inches below the lowermost member of the patient support. Further, when lift assembly is in its raised position, the lifting legs move outwardly toward the ends of the frame to thereby leave a space sufficient to allow a fluoroscope device to extend between the frame and the base.

Though not described in each instance, it should be understood that the structural components of the frame, the deck, and the lift assembly may be formed from metal structural members, such as steel, that are either welded (as noted in some cases) or fastened together, e.g. by bolts, rivets, pins, or screws or the like, or simply mechanically interlocked (as noted above in reference to some of the brackets). Further, features on one embodiment may be combined with features of another embodiment or embodiments. Additionally, it should be understood that the actuators may be controlled to extend or contract independently, for example, so that they can raise or lower one end of the patient support apparatus to orient the patient support apparatus deck in a Trendelenburg or reverse Trendelenburg position.

Directional terms, such as “vertical,” “horizontal,” “top,” “bottom,” “upper,” “lower,” “inner,” “inwardly,” “outer” and “outwardly,” are used to assist in describing the disclosure based on the orientation of the embodiments shown in the illustrations. The use of directional terms should not be interpreted to limit the disclosure to packages of any specific orientation(s).

Various alterations and changes can be made to the above-described embodiments without departing from the spirit and broader aspects of the disclosure as defined in the appended claims, which are to be interpreted in accordance with the principles of patent law including the doctrine of equivalents. This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the described disclosure may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present disclosure is not limited to only those embodiments that include all of these features or that provide all of the stated benefits, except to the extent otherwise expressly set forth in the issued claims. Any reference to claim elements in the singular, for example, using the articles “a,” “an,” “the” or “said,” is not to be construed as limiting the element to the singular.

We claim:

1. A patient support apparatus comprising:

a base;

a frame supported relative to said base, said frame configured to support a deck for supporting a patient thereon;

a lift assembly for raising or lowering said frame relative to said base and being pivotally coupled to said frame at an upper end thereof and pivotally coupled to said base at a lower end thereof;

said lift assembly including a first leg and a second leg, said second leg being pivotally mounted to said first leg at a medial portion thereof to form an inverted Y-shaped leg assembly when unfolded; said lift assembly being configured to be raised from a lowermost configuration according to a starting force SF that is less than a maximum force F1 when raising said frame relative to said base after said lift assembly is raised from said lowermost configuration; and an actuator mounted in said lift assembly with a mounting configuration to produce said maximum force F1 when raising said frame occurring after said lift assembly is raised from said lowermost configuration, a minimum force F2 when lowering said frame or raising said frame after said lift assembly is raised from said lowermost configuration, and said starting force SF at the lowermost configuration that is less than said maximum force F1, and wherein said minimum force F2 is in a range of 50% to 70% of said maximum force F1.

2. The patient support apparatus according to claim 1, wherein said maximum force F1 occurs prior to reaching a mid-stroke of said lift assembly.

3. The patient support apparatus according to claim 2, wherein said actuator is mounted in said lift assembly with a mounting configuration to produce said starting force SF when said lift assembly in said lowermost configuration and wherein said starting force SF is in a range of 95% to 99% of said maximum force F1.

4. The patient support apparatus according to claim 2, wherein said actuator is mounted in said lift assembly with a mounting configuration to produce said starting force SF when said lift assembly in said lowermost configuration wherein said starting force SF is about 97% of said maximum force F1.

5. The patient support apparatus according to claim 1, wherein said minimum force F2 is in a range of 55% to 65% of said maximum force F1.

6. The patient support apparatus according to claim 5, wherein said actuator is mounted with a configuration to produce said minimum force F2 when raising or lowering said frame wherein said minimum force F2 is about 60% of said maximum force F1.

7. The patient support apparatus according to claim 1, wherein said minimum force F2 occurs at a maximum height of said lift assembly.

8. The patient support apparatus according to claim 7, wherein said actuator is mounted in said lift assembly with a mounting configuration to produce said starting force SF wherein said minimum force F2 is in a range of 55% to 65% of said starting force SF.

9. A patient support apparatus comprising:

a base;

a frame supported relative to said base;

a deck supported relative to said frame for supporting a patient thereon, said deck having articulatable deck sections;

a lift assembly for raising or lowering said frame relative to said base between raised and lowered positions wherein said deck sections are raised or lowered together, and lift assembly being pivotally coupled relative to said frame at an upper end thereof and pivotally coupled to said base at a lower end thereof;

an actuator;

said lift assembly including a first leg and a second leg, said second leg being pivotally mounted to said first leg at a medial portion of said first leg about a folding pivot axis to form a Y-shaped leg assembly, said Y-shaped leg assembly including a slot fixed relative to and movable with said first leg;

said actuator mounted in said lift assembly, said actuator having a base mounted at a first pivotal connection with said first leg, and said actuator having an extendible rod coupled to a second sliding pivot connection with said first leg, said second sliding pivot connection being guided by said slot of said Y-shaped leg assembly, said second sliding pivot connection being located between said frame and said base when said frame is in a raised position; and said second sliding pivot connection linked to said second leg wherein when said actuator extends or contracts, said first leg and said second leg are unfolded or folded with respect to each other to raise or lower said deck.

10. The patient support apparatus according to claim 9, further comprising a link slidingly coupled to said first leg at said second sliding pivot connection and eccentrically coupled to said second leg by a crank arm.

11. The patient support apparatus according to claim 10, wherein said second sliding pivot connection between said link and said first leg comprises a non-linear sliding pivot connection.

12. The patient support apparatus according to claim 11, wherein said first leg includes lower pivot connections to said base, and wherein said second sliding pivot connection between said link and said first leg extends below said lower pivot connections of said first leg when said lift assembly is in said lowermost position.

13. A patient support apparatus comprising:

a base;

a frame supported relative to said base, said frame configured to support a deck for supporting a patient thereon;

a lift assembly for raising or lowering said frame relative to said base and being pivotally coupled to said frame at an upper end thereof and pivotally coupled to said base at a lower end thereof;

an actuator having a base and an extendable rod;

said lift assembly including a first leg and a second leg, said second leg being pivotally mounted to said first leg at a medial portion of said second leg to form an inverted Y-shaped leg assembly, said medial portion between first and second ends of said second leg that are spaced apart from said medial portion of said second leg;

said second leg having a crank arm;

a first link having first and second ends, said first end of said first link coupled to said crank arm; and a second link having first and second ends, said first end of said second link pivotally coupled to said extendable rod of said actuator, and said second end of said second link coupled to said second end of said first link, said second link configured to apply force to said crank arm via said first link, and said first link configured to move in a nonlinear path to thereby push or pull on said crank arm from a range of angles and thereby unfold or fold said first leg and said second leg with respect to each other to contract or extend said lift assembly.

14. The patient support apparatus according to claim 13, wherein said first leg includes an upper pivot connection to said frame, a lower pivot connection to said base, and said first link slidingly coupled to said first leg by a sliding pivot connection and pivotally coupled to said crank arm.

15. The patient support apparatus according to claim 14, wherein said sliding pivot connection comprises a non-linear sliding pivot connection.

16. A patient support apparatus comprising:

a base;

a frame supported relative to said base, said frame configured to support a deck for supporting a patient thereon;

a head end actuator;

a foot end actuator; and a lift assembly for raising or lowering said frame relative to said base, said lift assembly including a head end leg assembly and a foot end leg assembly, each of said leg assemblies having a pair of legs, each pair of legs including a first leg and a second leg forming an inverted Y-shaped configuration when raising said frame and being folded when lowering said frame, said inverted Y-shaped configuration including a slot fixed relative to and moveable with the first leg, said first legs pivotally mounted at upper ends to said frame and pivotally mounted at lower ends to said base, each pair of legs having a folding pivot axis, and each of said head end and foot end actuators having a pivot connection to a respective first leg and having a sliding lower pivot connection linked to said respective second leg, each of said sliding lower pivot connections having a path that is guided by said slot and that includes a linear portion and a curved portion, each of said sliding lower pivot connections being above said base when said frame is raised and extending below said base when said frame is fully lowered, and wherein said first and second legs of each leg assembly are linked such that extension and contraction of the respective actuators will unfold or fold said leg assemblies to raise or lower said frame.

17. The patient support apparatus according to claim 16, wherein each of said first legs is linked to said respective second leg by a link, and said links eccentrically mounted to respective second legs.

18. The patient support apparatus according to claim 17, wherein one end of each of said links is coupled to said respective first leg by a respective sliding pivot connection of said sliding pivot connections.

19. The patient support apparatus according to claim 18, wherein said sliding pivot connections of said actuators to said first legs having linear paths.

* * * * *